US011898381B2

(12) United States Patent
Kitamura et al.

(10) Patent No.: US 11,898,381 B2

(45) Date of Patent: Feb. 13, 2024

(54) WATERPROOF STRUCTURE FOR DOOR LATCH DEVICE

(71) Applicant: MITSUI KINZOKU ACT CORPORATION, Kanagawa (JP)

(72) Inventors: Yosuke Kitamura, Kanagawa (JP); Tatsuya Takayama, Kanagawa (JP)

(73) Assignee: MITSUI KINZOKU ACT CORPORATION, Kanagawa (JP)

(*) Notice: Subject to any disclaimer, the term of this patent is extended or adjusted under 35 U.S.C. 154(b) by 14 days.

(21) Appl. No.: 17/469,607

(22) Filed: Sep. 8, 2021

(65) Prior Publication Data

US 2022/0074239 A1 Mar. 10, 2022

(30) Foreign Application Priority Data

Sep. 10, 2020 (JP) ................................ 2020-152276

(51) Int. Cl.
*E05B 77/34* (2014.01)
*E05B 79/20* (2014.01)

(52) U.S. Cl.
CPC .............. *E05B 77/34* (2013.01); *E05B 79/20* (2013.01)

(58) Field of Classification Search
CPC .......... E05B 77/34; E05B 79/20; E05B 79/22; E05B 85/02; E05B 79/04; E05B 83/36
See application file for complete search history.

(56) References Cited

U.S. PATENT DOCUMENTS

| | | | | |
|---|---|---|---|---|
| 2010/0199464 A1* | 8/2010 | Sano | ...................... | F16B 21/086 24/289 |
| 2019/0218829 A1* | 7/2019 | Uhrin | ...................... | F16C 1/107 |
| 2021/0270063 A1* | 9/2021 | Maeda | .................... | E05B 81/90 |

FOREIGN PATENT DOCUMENTS

| | | | | |
|---|---|---|---|---|
| DE | 102018129748 A1 * | 5/2020 | | |
| EP | 3219888 A1 * | 9/2017 | ............. | E05B 77/34 |
| EP | 3219888 A1 | 9/2017 | | |
| JP | 2016056551 A * | 4/2016 | | |
| JP | 2017-166286 A | 9/2017 | | |
| WO | WO-2015118916 A1 * | 8/2015 | ............. | E05B 77/34 |

* cited by examiner

*Primary Examiner* — Kristina R Fulton
*Assistant Examiner* — James Edward Ignaczewski
(74) *Attorney, Agent, or Firm* — Rimon, P.C.

(57) ABSTRACT

A waterproof structure of a door latch device, in which one end part of a cable is connected to an input lever including one end part projecting toward outside of a case, includes a cover including: a cover main body having a box shape with a cover opening, the cover main body being configured to house the one end part of the input lever and the one end part of the cable via the cover opening when the cover main body abuts on the case; and a cover supporting body extending from the cover main body. The cover is attached to the case via the cover supporting body in a state in which the cover main body is movable between a closed position at which the cover main body abuts on the case and an opened position at which the cover main body is separated from the case.

11 Claims, 17 Drawing Sheets

WATERPROOF STRUCTURE FOR DOOR LATCH DEVICE

The present application claims priority to and incorporates by reference the entire contents of Japanese Patent Application No. 2020-152276 filed in Japan on Sep. 10, 2020.

BACKGROUND

The present disclosure relates to a waterproof structure of a door latch device.

A door latch device disposed on a door of a vehicle needs a waterproof structure for preventing, in a case in which water such as rainwater enters an inner part of the door, water from reaching an inner part of the device. Principal components constituting the door latch device such as a latch engaging with a striker or a ratchet for restricting movement of the latch may be prevented from being exposed to water such as rainwater by being housed inside a case. However, an input lever to which operation force of a door handle is input needs to be connected with a cable for associating the door handle with the input lever, so that an end part to which the cable is connected is forced to project toward the outside of the case via a notch. Thus, in the related art, developed is a door latch device that prevents a situation in which water enters an inner part through a notch of a case by disposing a cover member on an outer part of the case to cover a projecting end part of an input lever and a cable with the cover member (for example, refer to Japanese Patent Application Laid-open No. 2017-166286).

SUMMARY

In the waterproof structure of the door latch device disclosed in Japanese Patent Application Laid-open No. 2017-166286, an input lever and a cable are housed inside a cover member constituted of three parts including a bottom part, a frame part, and a lid part. The bottom part and the frame part are fixed to the case, but the lid part may be opened and closed with respect to the frame part, so that work for connecting the input lever with the cable may be facilitated. However, in this waterproof structure, a sealing member is necessary for a space between the frame part and the case, and the sealing member is further necessary for a space between the frame part and the lid part, so that there is the concern that the number of components increases, and work for assembling the door latch device is complicated.

According to one aspect of the present disclosure, there is provided a waterproof structure of a door latch device in which one end part of a cable is connected to an input lever, the input lever including one end part projecting toward outside of a case, and operation force is transmitted to the input lever via the cable to operate a latch mechanism disposed inside the case, the waterproof structure including a cover including: a cover main body having a box shape with a cover opening, the cover main body being configured to house the one end part of the input lever and the one end part of the cable via the cover opening when the cover main body abuts on the case; and a cover supporting body extending from the cover main body, wherein the cover is attached to the case via the cover supporting body in a state in which the cover main body is movable between a closed position at which the cover main body abuts on the case and an opened position at which the cover main body is separated from the case.

BRIEF DESCRIPTION OF THE DRAWINGS

FIG. 6A is a perspective view viewed from an outer side, and FIG. 6B is a perspective view viewed from an inner side;

FIG. 7A is a perspective view of a state in which two supporting plate elements are overlapped with each other, and FIG. 7B is a perspective view of a folded state of the supporting plate elements that has been changed;

FIG. 10A is a cross-sectional bottom view of the case, and FIG. 10B is a cross-sectional bottom view of the cover member arranged at the closed position with respect to the case;

FIG. 11A is a cross-sectional view of the case viewed from a rear side, and FIG. 11B is a cross-sectional view of the cover member arranged at the closed position with respect to the case viewed from the rear side;

FIG. 14A is a cross-sectional view of the cover member arranged at the closed position viewed from the front side, and FIG. 14B is a cross-sectional view of the cover member arranged at the opened position viewed from the front side;

FIG. 17A is a principal part cross-sectional view of a principal part of the door latch device according to a first modification viewed from the front side, and FIG. 17B is a principal part cross-sectional view of a principal part of the door latch device according to a second modification viewed from the front side.

DETAILED DESCRIPTION

The following describes a preferred embodiment of a waterproof structure of a door latch device in detail with reference to the attached drawings.

Figure 1:
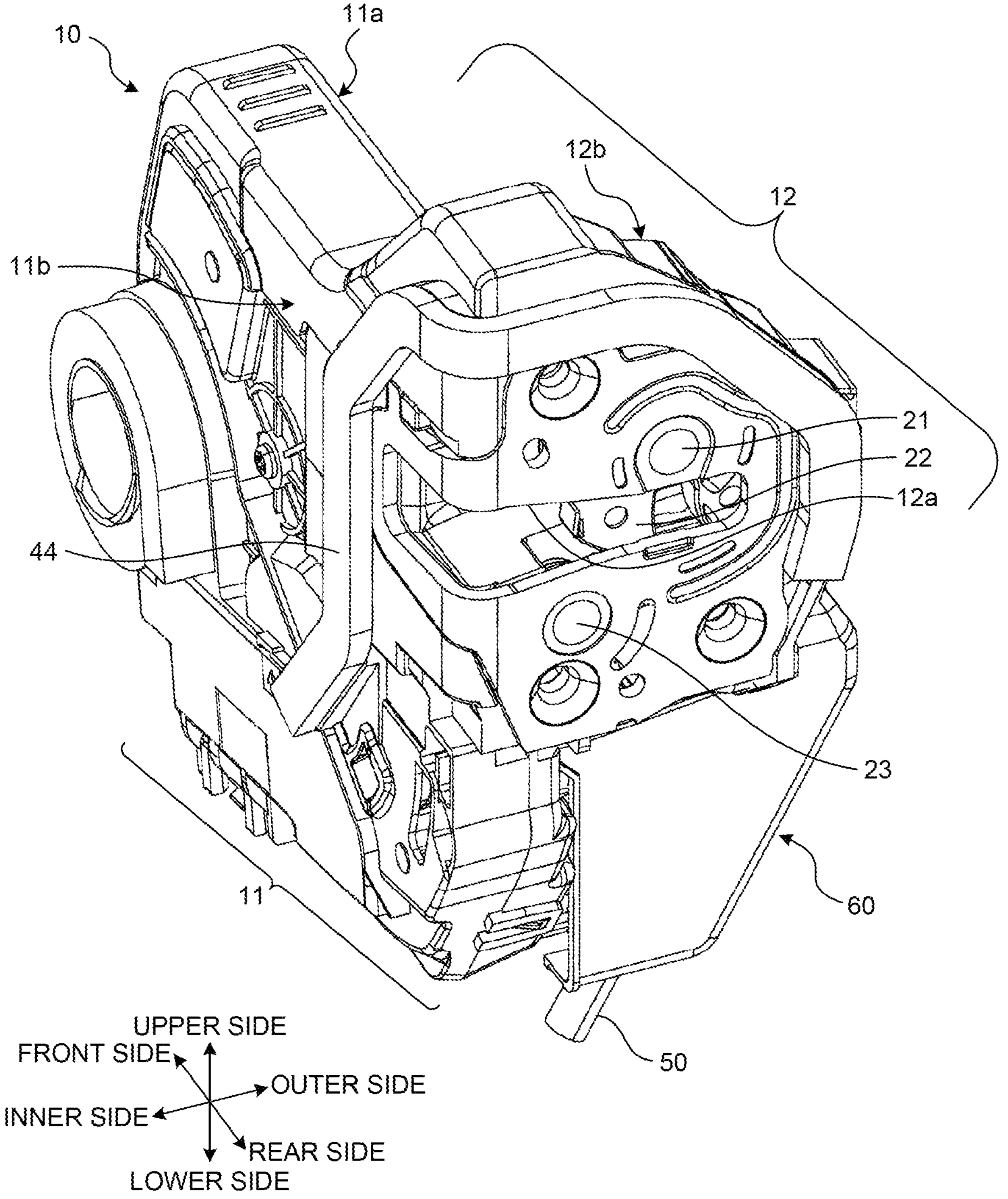
FIG. 1 is a perspective view illustrating external appearance of a door latch device to which a waterproof structure according to an embodiment is applied.
Figure 2:
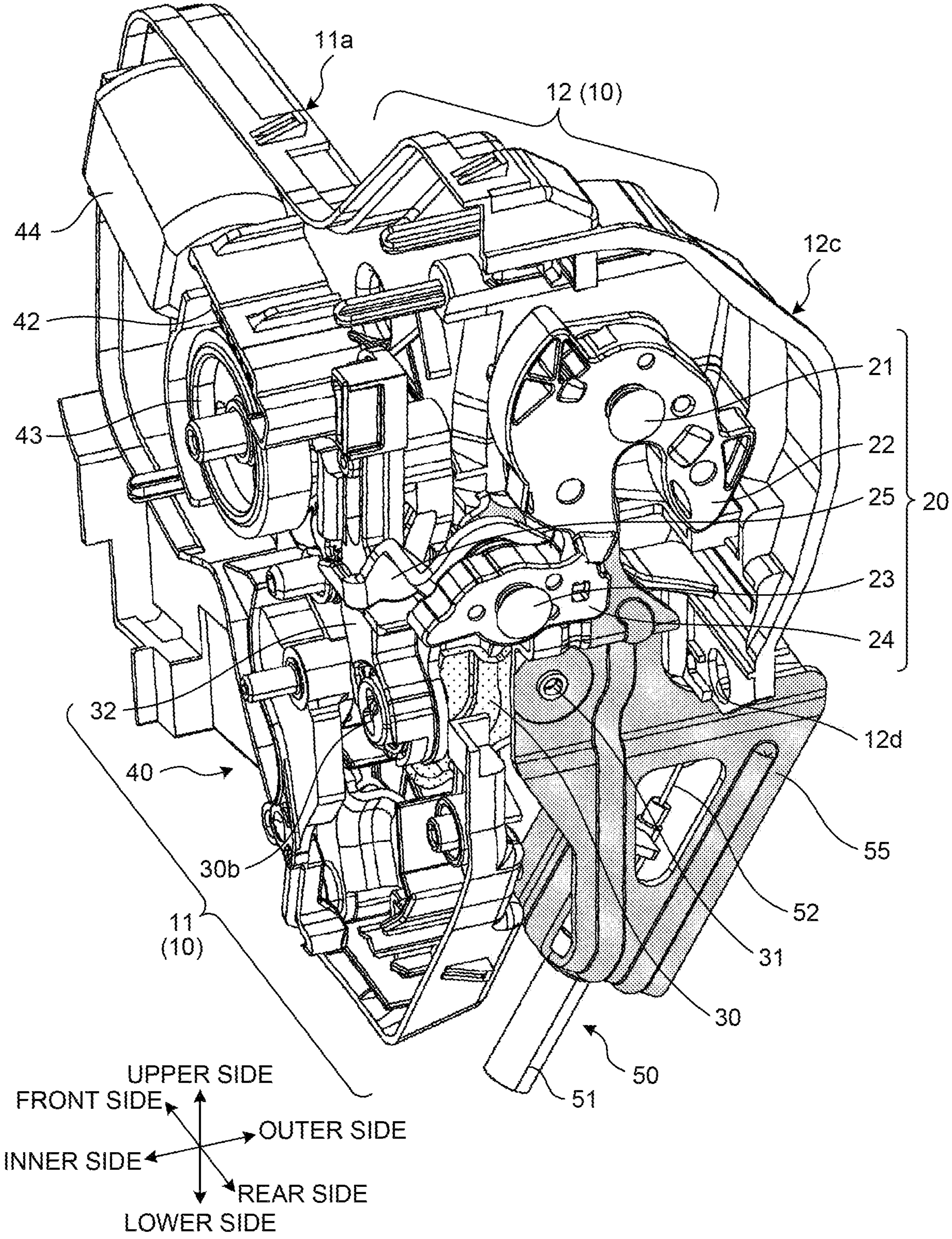
FIG. 2 is a perspective view illustrating an internal configuration of the door latch device illustrated in FIG. 1.
Figure 3:
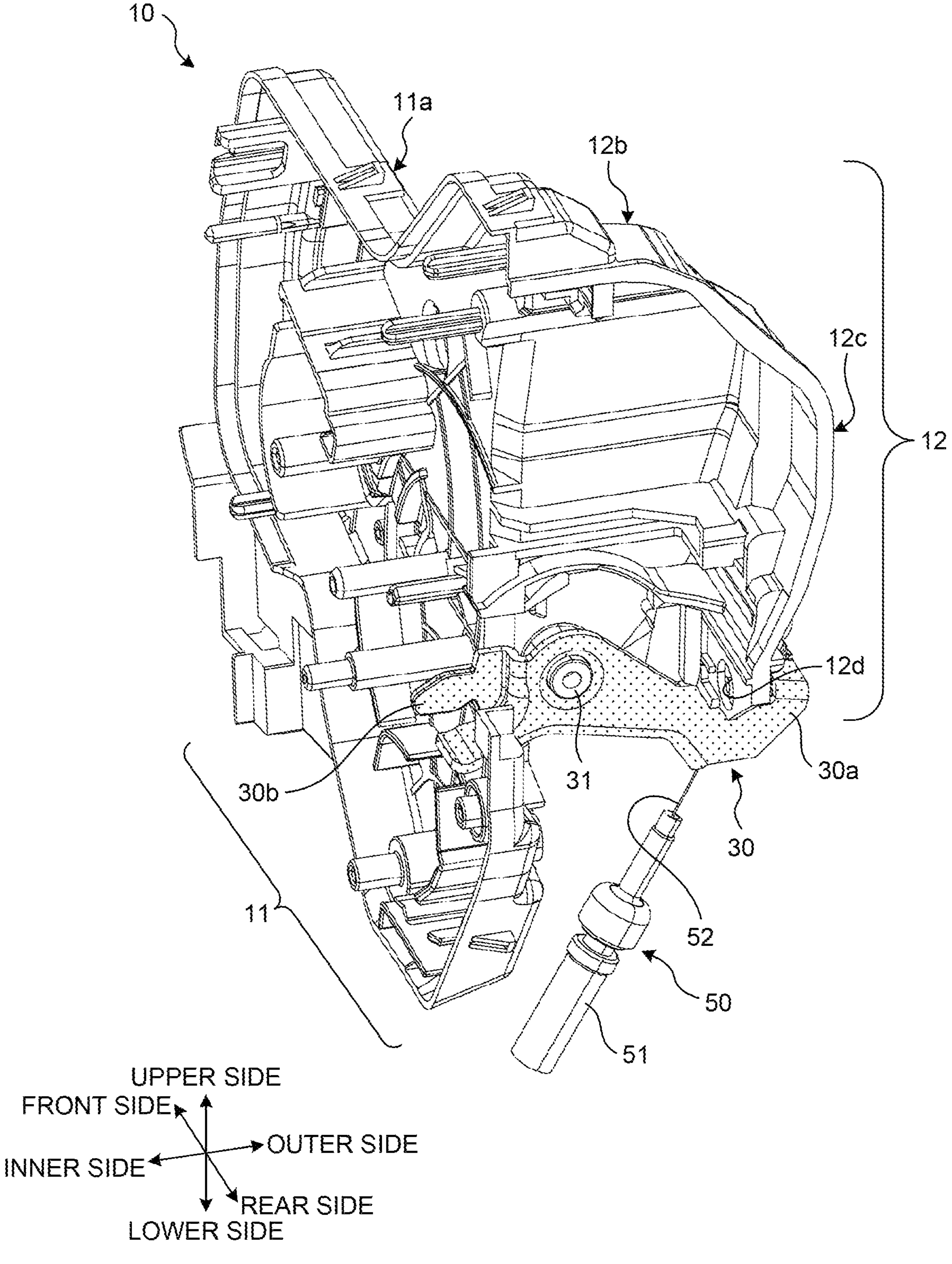
FIG. 3 is a perspective view illustrating an arrangement state of a case, an input lever, and a cable of the door latch device illustrated in FIG. 1.

FIG. 1 to FIG. 3 illustrate the door latch device to which the waterproof structure according to the embodiment is applied. Although not clearly illustrated in the drawings, the door latch device exemplified herein is incorporated in a front hinge-type side door arranged on the right side of a four-wheeled automobile to control opening/closing of the side door with respect to a vehicle main body. The following describes a typical configuration of the door latch device. However, the description is exemplary only, and does not intend to limit the waterproof structure. For convenience' sake, regarding the configuration of the door latch device, directions are specified for the door latch device in an attitude of being mounted on the side door in a closed state. Regarding a direction along the left and the right, an indoor (center) side of the vehicle main body is referred to as an inner side, and an outdoor side thereof is referred to as an outer side.

As illustrated in FIG. 1 to FIG. 3, the door latch device includes a latch unit (latch mechanism) 20 and an outside handle lever (input lever) 30 inside a case 10. Although not clearly illustrated in the drawings, the case includes a device main body part 11 extending toward the front side and the rear side along an inside panel of the side door, and a latch housing part 12 extending toward the outer side at a substantially right angle from a portion positioned on a rear side of the device main body part 11, and has a substantially L-shape in a plan view. The latch housing part 12 is a part mainly for housing the latch unit 20. The device main body part 11 is a part mainly for housing a lock mechanism 40 for switching the latch unit 20 between a locked state and an unlocked state, an electric motor 41 for driving the door latch device, and a deceleration mechanism constituted of a worm 42 and a worm wheel 43. As is clear from the drawings, the latch housing part 12 has a dimension along an upper and lower direction that is substantially ½ of that of the device main body part 11, and is disposed at a portion as an upper half part on the rear side of the device main body part 11. Although not clearly illustrated in the drawings, the latch housing part 12 is disposed so that a portion thereof positioned on the rear side is exposed to the outside from a back panel of the side door, and includes a striker entry groove 12*a* at the portion exposed to the outside. The striker entry groove 12*a* is a notch that a striker disposed on the vehicle main body enters in a case in which the side door is closed with respect to the vehicle main body, and formed to be substantially horizontal along a right and left direction. Although not clearly illustrated in the drawings, window glass disposed on the side door is arranged to be able to move upward and downward at a portion closer to the outer side than an outer surface 11*a* of the device main body part 11 is and closer to a front side than a front surface 12*b* of the latch housing part 12 is. As illustrated in FIG. 1, a continuous case sealing member 44 is arranged between a portion closer to the front side than the striker entry groove 12*a* is and a portion on the upper side of the striker entry groove 12*a* on an inner surface 11*b* opposed to the side panel of the side door in the device main body part 11. The case sealing member 44 is arranged to extend toward the outer side from the portion on the upper side of the striker entry groove 12*a* in the latch housing part 12, and extend toward the lower side to a portion as an extension of the striker entry groove 12*a*.

As illustrated in FIG. 2, the latch unit 20 includes a latch 22 arranged on the case 10 in a rotatable manner via a latch shaft 21, and a ratchet 24 arranged on the case 10 in a rotatable manner via a ratchet shaft 23. The latch shaft 21 and the ratchet shaft 23 extend to be substantially horizontal along the front and the rear of the vehicle main body. In the example illustrated in the drawing, the latch shaft 21 is disposed at a portion closer to the upper side than the striker entry groove 12*a* is, and the ratchet shaft 23 is disposed at a portion closer to the lower side than the striker entry groove 12*a* is and closer to the inner side than the latch shaft 21 is. In a case of closing the side door with respect to the vehicle main body, the striker (not illustrated) relatively enters the striker entry groove 12*a* from the left in the drawing.

Although not clearly illustrated in the drawings, the latch 22 is in a state of being energized in an engagement releasing direction (clockwise in the drawing) at all times by spring force of a latch spring disposed between the latch 22 and the case 10. The ratchet 24 is energized in an engaging direction (counterclockwise in the drawing) at all times by spring force of a ratchet spring disposed between the ratchet 24 and the case 10, and an end part on the outer side is in a state of abutting on a peripheral surface of the latch 22. When the side door is closed, and the striker that has entered the striker entry groove 12*a* abuts on the latch 22, the latch 22 rotates counterclockwise against the spring force of the latch spring. When the rotation of the latch 22 proceeds to a predetermined engaging position, the ratchet 24 engages with the latch 22, and the rotation of the latch 22 in the releasing direction is hindered (state illustrated in FIG. 2). As a result, movement of the striker in a deviating direction from the striker entry groove 12*a* is hindered, and the side door is kept in a closed state with respect to the vehicle main body.

A ratchet lever 25 is disposed on the ratchet 24 to be integrally rotated. The ratchet lever 25 extends along the right and left direction at a portion of the ratchet shaft 23 closer to the front side than the ratchet 24 is. When the ratchet lever 25 is rotated against the spring force of the ratchet spring to move an end part on the inner side toward the upper side, the ratchet 24 rotates clockwise, so that the engaged state with the latch 22 is released, and the latch 22 rotates clockwise by the spring force of the latch spring. As a result, movement of the striker in the deviating direction from the striker entry groove 12*a* is allowed, so that the side door may be opened with respect to the vehicle main body.

As illustrated in FIG. 3, the outside handle lever 30 is arranged, at a portion closer to the lower side than the ratchet shaft 23 is, so as to be rotatable via an outside lever shaft 31 along the front and the rear of the vehicle main body. An outer end part (one end part) 30*a* positioned on the outer side of the outside handle lever 30 is in a state of projecting toward the outside via a notch 10*b* (refer to FIG. 4) disposed on the case 10, and associated with an outside door handle of the side door (not illustrated) via an outside cable (cable) 50. More specifically, the outer end part 30*a* of the outside handle lever 30 projects toward the outside of the case 10 via the notch 10*b* disposed in the vicinity of a lower end part of the latch housing part 12 on the rear side of the device main body part 11. An open link 32 is engaged with an inner end part 30*b* of the outside handle lever 30 positioned on the inner side of the vehicle main body as illustrated in FIG. 2. The open link 32 is arranged at a portion closer to the lower side than the ratchet lever 25 is inside the case 10, and may move upward and downward with respect to the case 10 by operation of the outside handle lever 30. In a case in which the open link 32 moves toward the upper side, the open link 32 abuts on an end part on the inner side of the ratchet lever 25, and the ratchet 24 rotates in a non-engaging direction (clockwise in the drawing) against the spring force of the ratchet spring. Although not clearly illustrated in the drawings, the outside door handle is supported in a movable manner with respect to a handle bracket, and attached to the side door via the handle bracket.

Figure 4:
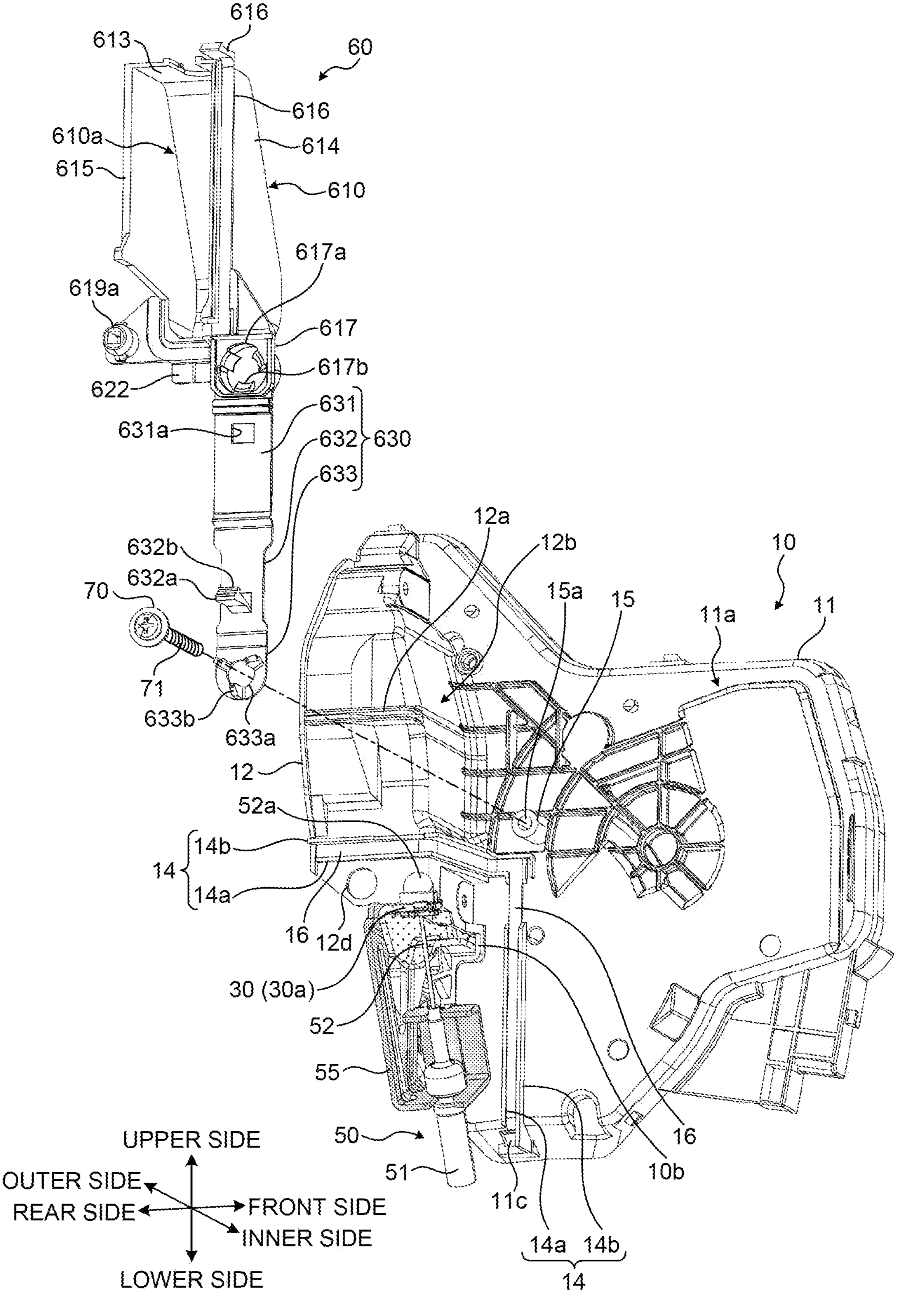
FIG. 4 is an exploded perspective view illustrating the case and a cover member of the door latch device illustrated in FIG. 1.
Figure 5:
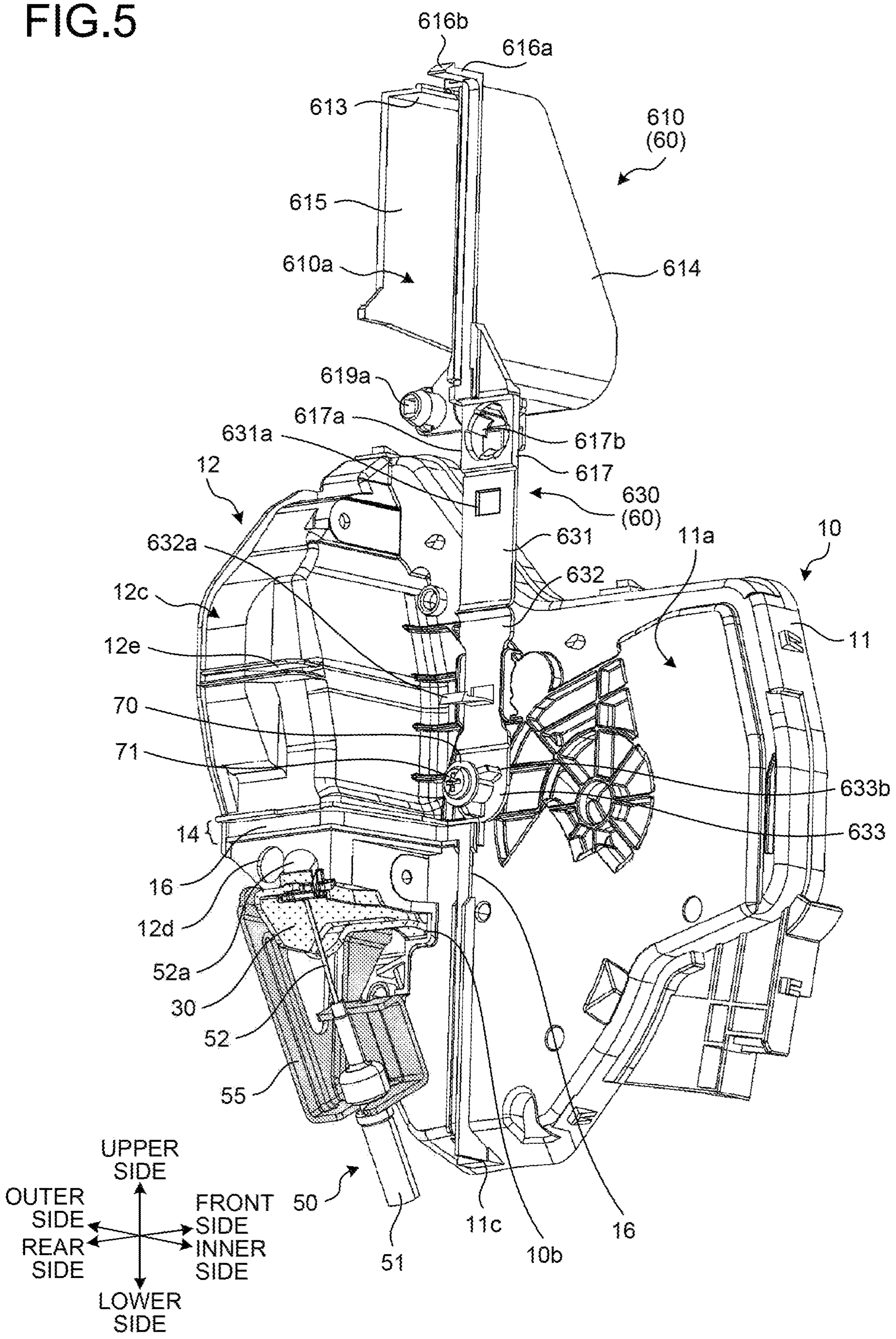
FIG. 5 is a perspective view of a state in which a cover main body is attached to the case of the door latch device via a cover supporting body following the state in FIG. 4.

As illustrated in FIG. 3 to FIG. 5, the outside cable 50 is obtained by arranging an inner cable 52 inside an outer tube 51, and includes a cable end at an end part of the inner cable 52. In the outside cable 50, one end part of the inner cable 52 is connected to the outer end part 30*a* of the outside handle lever 30 via a cable end 52*a*, and one end part of the outer tube 51 is fixed to the device main body part 11 via a cable bracket 55. As illustrated in FIG. 2, an upper half part of the cable bracket 55 is arranged inside the latch housing part 12, and a lower end part thereof projects toward the lower side from a lower surface portion of the latch housing part 12. Although not clearly illustrated in the drawings, at the other end part of the outside cable 50, the inner cable 52 is connected to the outside door handle via the cable end, and the outer tube 51 is fixed to the handle bracket. That is, when an opening operation is performed on the outside door handle of the side door, the inner cable 52 performs pull-in operation with respect to the outer tube 51 in the door latch device, and the outside handle lever 30 rotates clockwise in FIG. 3. Thus, when the opening operation is performed on the outside door handle in a state in which the side door is closed with respect to the vehicle main body, the open link 32 moves toward the upper side, and the engaged state of the ratchet 24 with the latch 22 is released, so that the side door may be opened with respect to the vehicle main body. In the example illustrated in the drawing, each of the outside cable 50 and the cable bracket 55 is disposed to be inclined with respect to the outer surface 11*a* of the device main body part 11 so that projecting amounts of the outside cable 50 and the cable bracket 55 from the case 10 become the minimum, and the outside cable 50 and the cable bracket 55 extend toward the inner side so as to be closer to the lower side from the outer end part 30*a* of the outside handle lever 30.

Figures 6A, 6B:
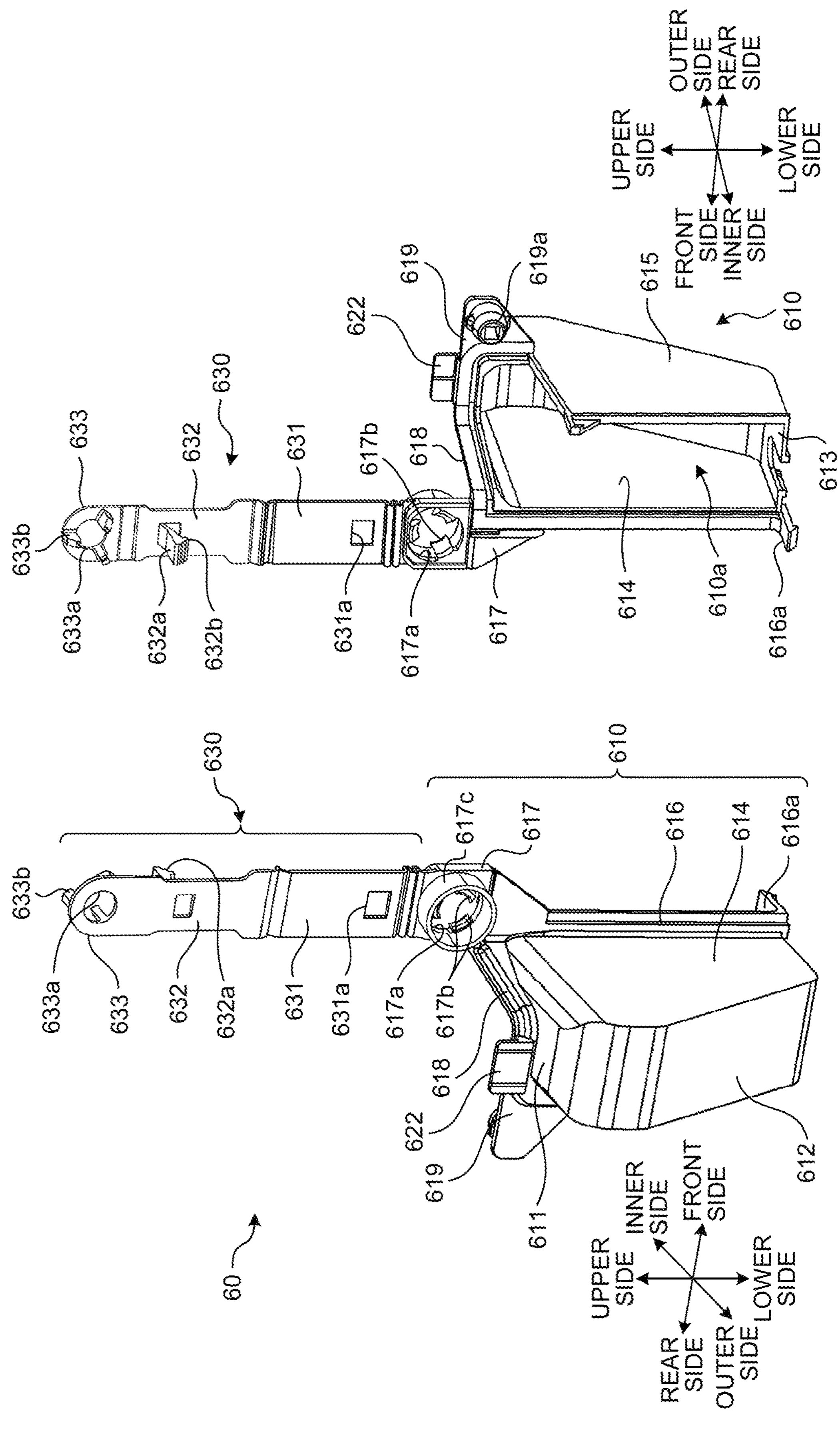
FIGS. 6A and 6B illustrate the cover member to be applied to the waterproof structure of the door latch device illustrated in FIG. 1.
Figure 7B:
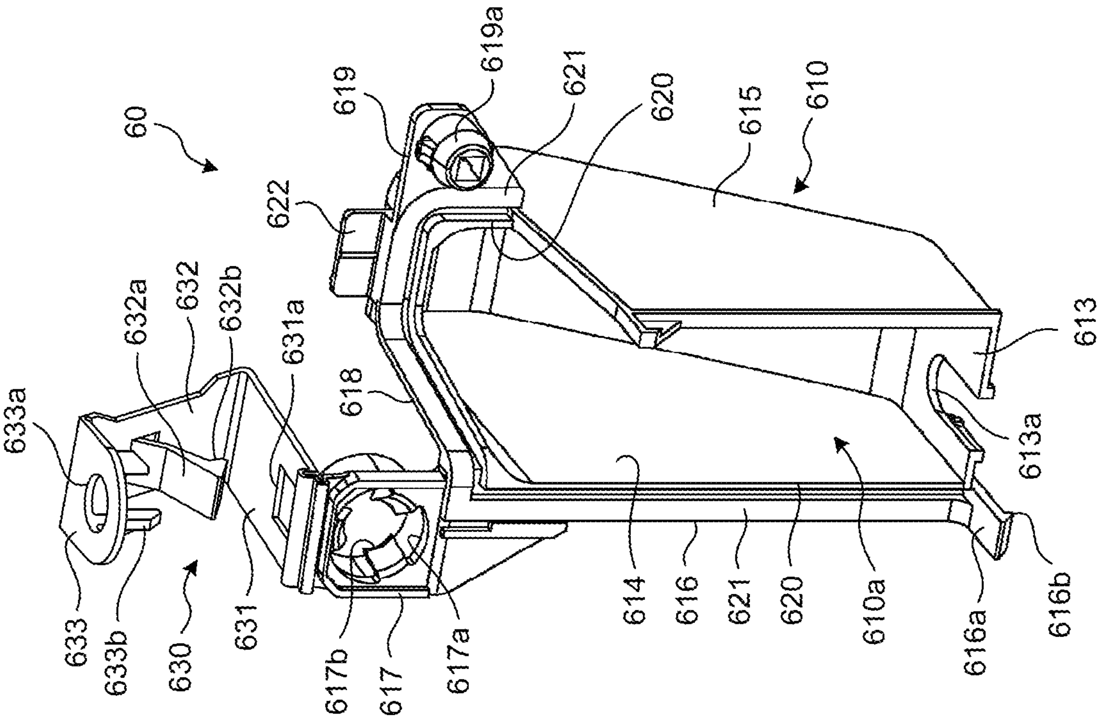
FIGS. 7A and 7B illustrate a state in which the cover supporting body of the cover member illustrated in FIG. 6 is folded viewed from an inner side.
Figure 7A:
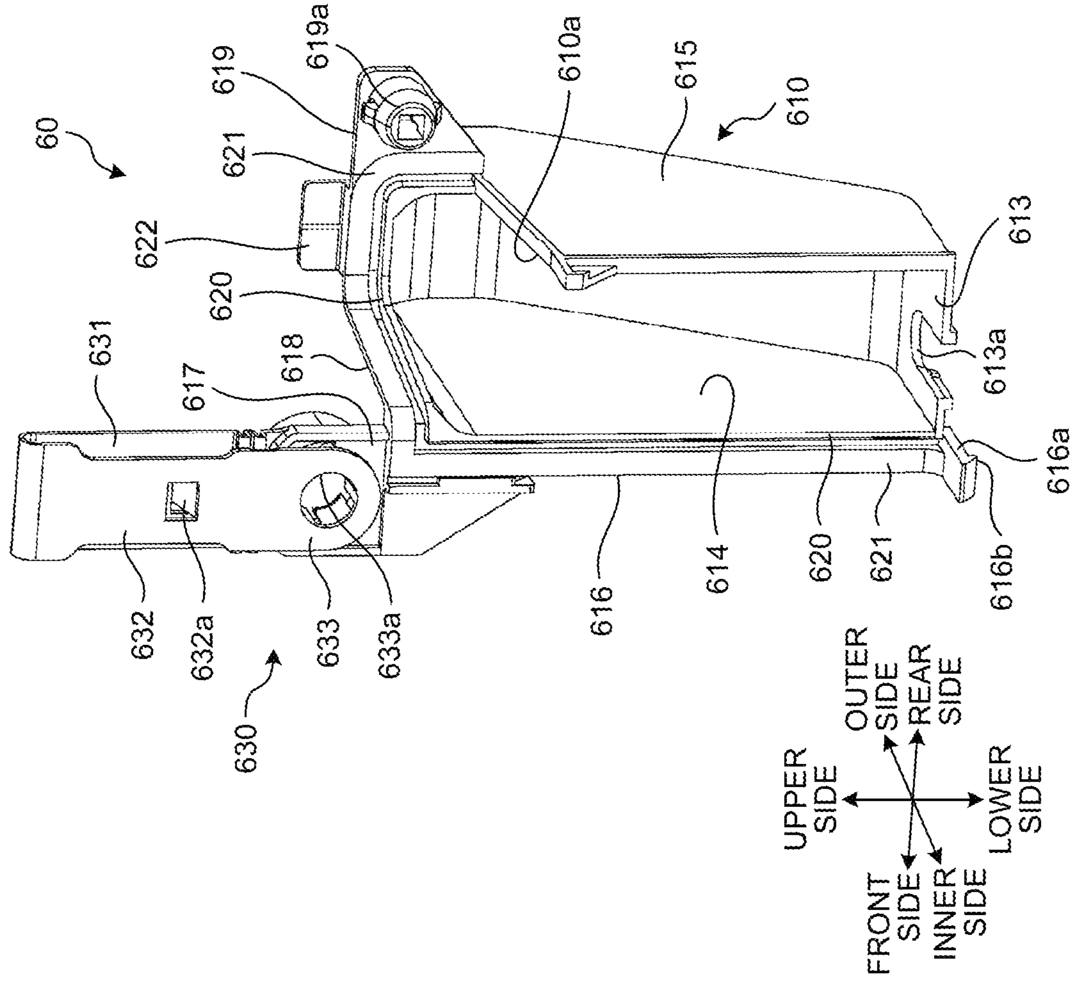

In the door latch device having the configuration described above, a waterproof cover (cover member) 60 is arranged at a portion of the case 10 closer to the outer side than the device main body part 11 is and closer to the lower side than the latch housing part 12 is. The waterproof cover 60 is integrally formed by resin, and includes a cover main body 610 and a cover supporting body 630. The cover main body 610 has a box shape having such a size that may simultaneously house the outer end part 30*a* of the outside handle lever 30 described above, one end part of the outside cable 50 connected to the outer end part 30*a* of the outside handle lever 30, and the cable bracket 55. In the present embodiment, as illustrated in FIG. 6 and FIG. 7, the cover main body 610 is constituted of an upper wall part 611, an outer side wall part 612, a bottom wall part 613, a front wall part 614, a rear wall part 615, a front edge wall part 616, an attachment wall part 617, an upper edge front wall part 618, and an upper edge outer wall part 619.

Figure 8:
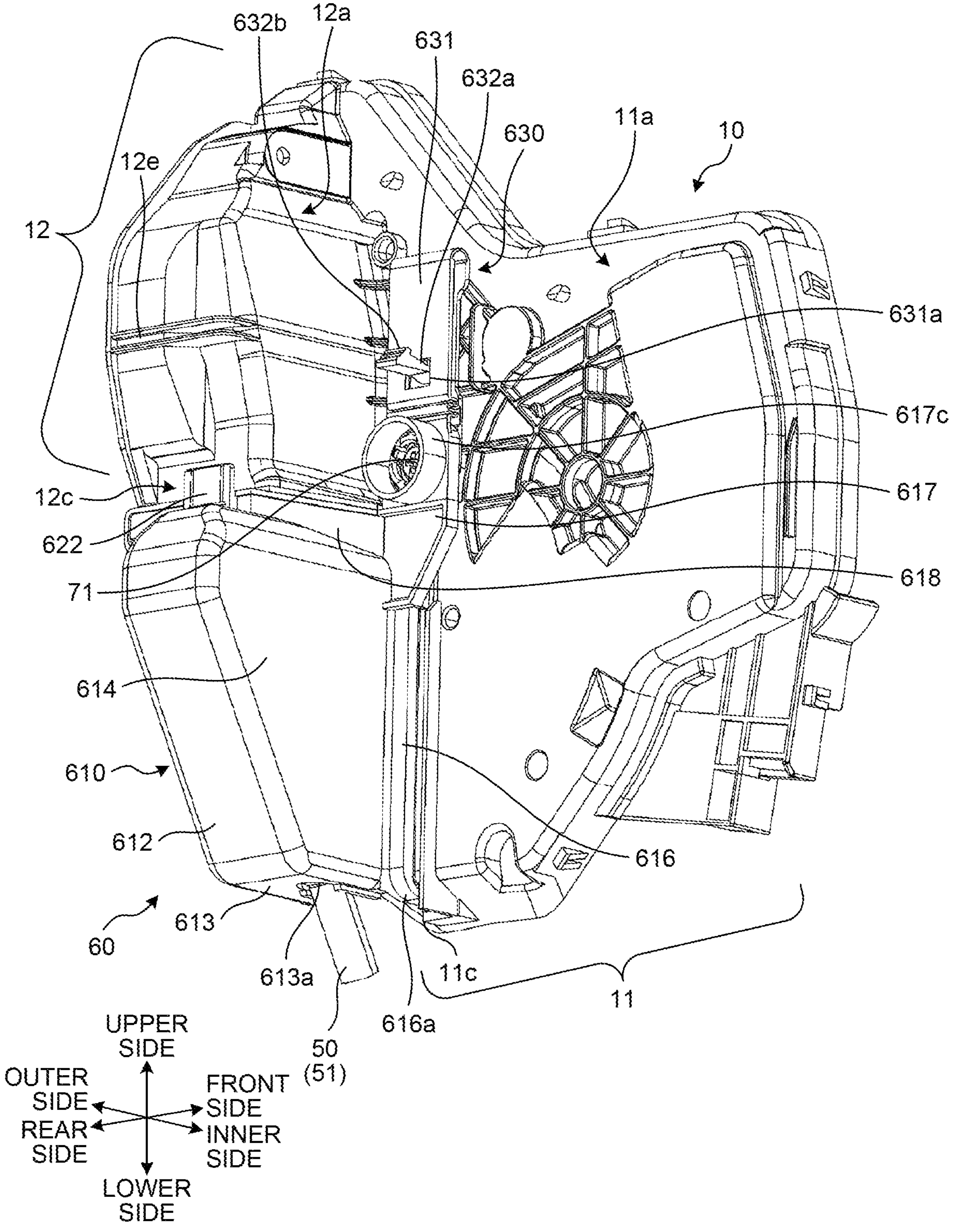
FIG. 8 is a perspective view of the cover member arranged at a closed position in the door latch device illustrated in FIG. 1.
Figure 9:
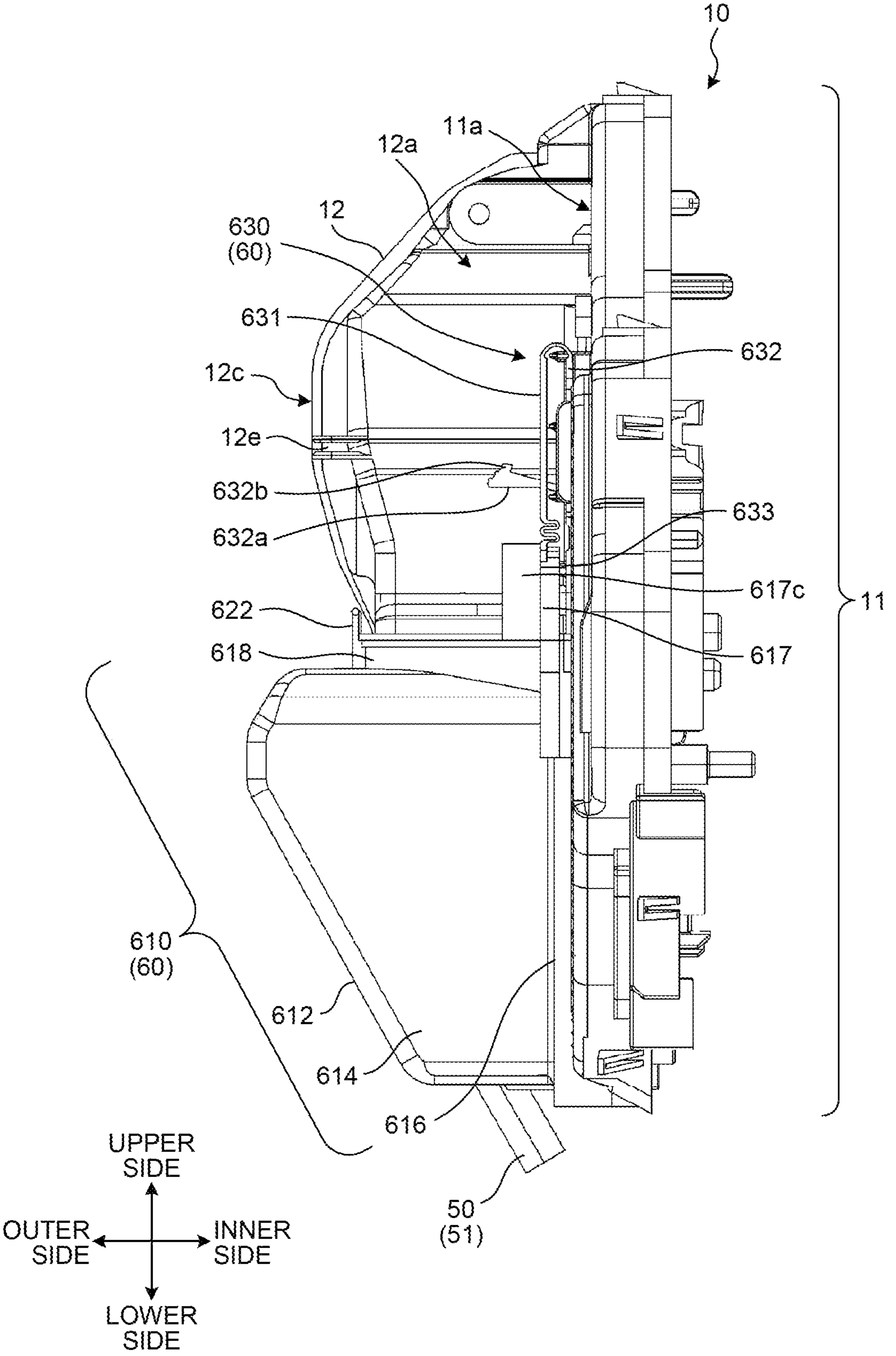
FIG. 9 is a diagram illustrating the door latch device in FIG. 8 viewed from a front side.

As illustrated in FIG. 8 and FIG. 9, the upper wall part 611 is a portion constituting an upper surface of the cover main body 610 in a case in which the cover main body 610 is caused to abut on the outer surface 11*a* of the device main body part 11 and houses the outer end part 30*a* of the outside handle lever 30 and the like (hereinafter, this state is referred to as a closed position of the cover main body 610. Attitudes of other constituent elements of the cover main body 610 described later are specified in a state in which the cover main body is arranged at the closed position). The upper wall part 611 slightly extends toward the front side from the front surface 12*b* of the latch housing part 12, and extends toward the outer side from the outer surface 12*c* of the latch housing part 12.

The outer side wall part 612 is a portion positioned on the outer side of the cover main body 610, and extends toward the lower side from an outer edge portion of the upper wall part 611. In the example illustrated in the drawing, the outer side wall part 612 is disposed to be gradually inclined toward the inner side so as to be closer to the lower side.

The bottom wall part 613 is a portion positioned on the lower side of the cover main body 610, and extends substantially horizontally from a lower edge of the outer side wall part 612 toward the inner side. A slit 613*a* for a cable is disposed on the bottom wall part 613. The slit 613*a* for a cable is a notch having a width through which the outer tube 51 of the outside cable 50 may be inserted, and opened at an edge portion positioned on the inner side of the bottom wall part 613.

The front wall part 614 is a portion positioned on the front side of the cover main body 610, and disposed to cover from front edge portions of the upper wall part 611 and the outer side wall part 612 to the outer surface 11*a* of the device main body part 11.

The rear wall part 615 is a portion positioned on the rear side of the cover main body 610, and disposed to be opposed to the front wall part 614 at rear edge portions of the outer side wall part 612 and the bottom wall part 613.

The front edge wall part 616 extends toward the front side from an inner edge portion of the front wall part 614 along the outer surface 11*a* of the device main body part 11. A locking piece 616*a* is disposed at a lower end of the front edge wall part 616. The locking piece 616*a* projects substantially horizontally from the front edge wall part 616 toward the inner side, and includes a locking projection 616*b* at a projecting end part. In a case in which the cover main body 610 is arranged at the closed position, the locking piece 616*a* may restrict movement of the cover main body 610 in a direction separated from the device main body part 11 by locking the locking projection 616*b* onto a locking reception part 11*c* disposed on a lower surface of the device main body part 11.

The attachment wall part 617 is a portion extending toward the front side and the upper side along the outer surface 11*a* of the device main body part 11 from a portion on the inner side of an upper corner portion at which the upper wall part 611 intersects with the front wall part 614, and has a larger width than that of the front edge wall part 616. A mounting hole 617*a* and a plurality of cover engagement pieces (cover engagement parts) 617*b* are disposed at an upper end part of the attachment wall part 617. The mounting hole 617*a* is an opening having a substantially circular shape, and disposed to pass through the attachment wall part 617 in the right and left direction. The cover engagement pieces 617*b* project from an inner peripheral surface of the mounting hole 617*a* at regular intervals while inclining toward the outer side so as to be closer to a center part. In the example illustrated in the drawing, the three cover engagement pieces 617*b* are disposed to extend from an inner peripheral edge portion of the mounting hole 617*a* toward the center. The cover engagement pieces 617*b* may be elastically deformed, and gaps formed among projecting end parts may be widened. In the attachment wall part 617 according to the present embodiment, a cylindrical peripheral wall part 617*c* is disposed at a portion of the attachment wall part 617 around the mounting hole 617*a* to cover the cover engagement pieces 617*b*.

The upper edge front wall part 618 projects toward the upper side from a rear edge portion of the upper wall part 611. A portion positioned on the inner side of the upper edge front wall part 618 is continuous to an upper end part of the front edge wall part 616 via the attachment wall part 617.

The upper edge outer wall part 619 is disposed to project toward the rear side from a portion positioned on the outer side of the upper edge front wall part 618 across the rear wall part 615. As is clear from the drawing, at a portion of the upper edge outer wall part 619 projecting toward the rear side from the rear wall part 615, a positioning pin 619*a* is disposed on a surface positioned on the inner side. The positioning pin 619*a* is a columnar member extending substantially horizontally along the right and left direction, and may be engaged with a positioning hole 12*d* disposed on the latch housing part 12 in a case in which the cover main body 610 is arranged at the closed position.

In a case in which the cover main body 610 having the configuration described above is arranged at the closed position, a portion across an inner side portion opposed to the device main body part 11, an inner side portion of the upper wall part 611, and an upper portion of the rear wall part 615 is opened as a continuous cover opening 610*a*, and the cover main body 610 may house the outer end part 30*a* of the outside handle lever 30, one end part of the outside cable 50 connected to the outer end part 30*a* of the outside handle lever 30, and the cable bracket 55 via the cover opening 610*a*.

Figure 10A:
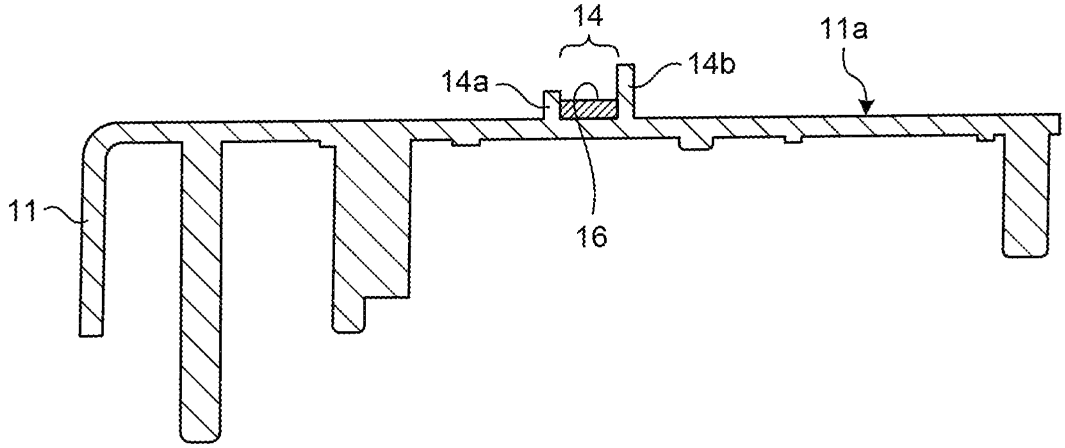
FIGS. 10A and 10B illustrate a principal part of the door latch device illustrated in FIG. 1.
Figure 10B:
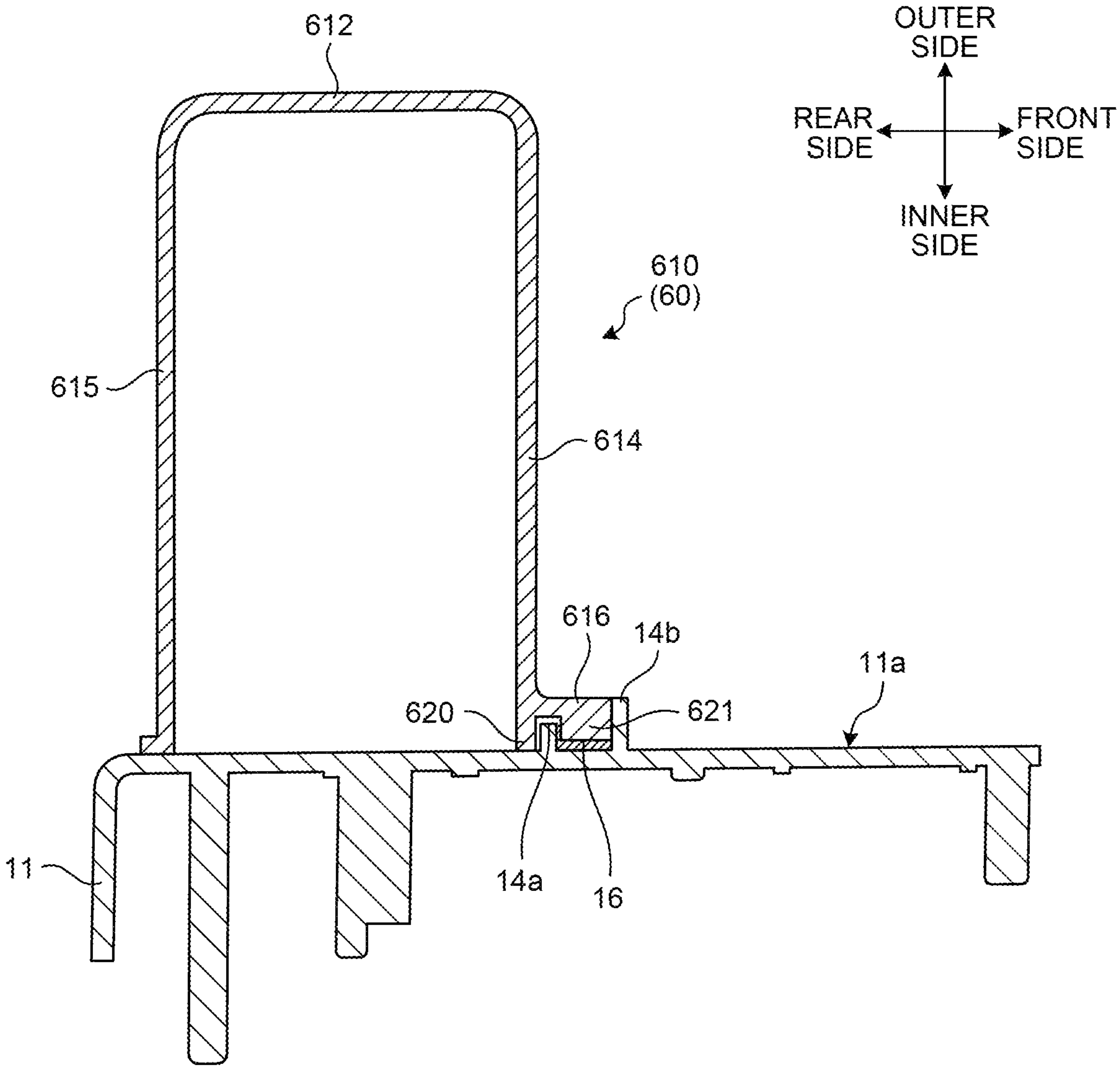
Figure 11A:
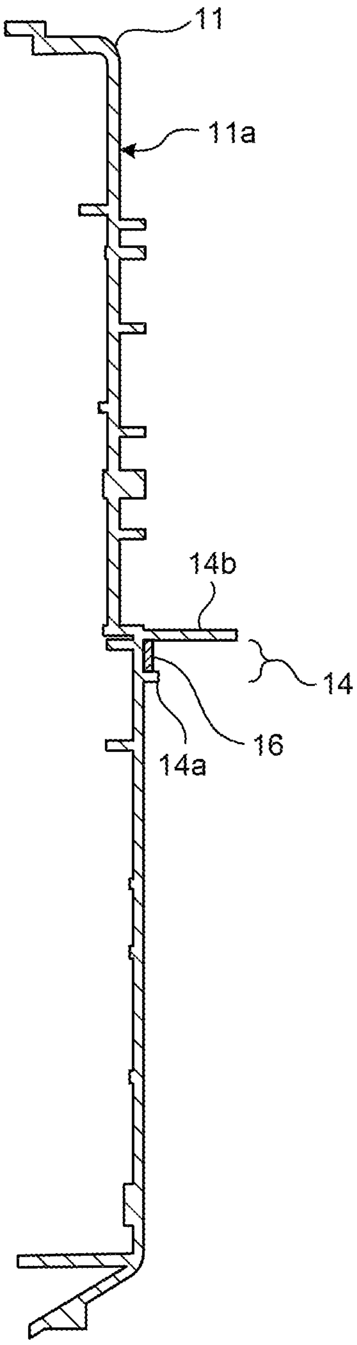
FIGS. 11A and 11B illustrate a principal part of the door latch device illustrated in FIG. 1.
Figure 11B:
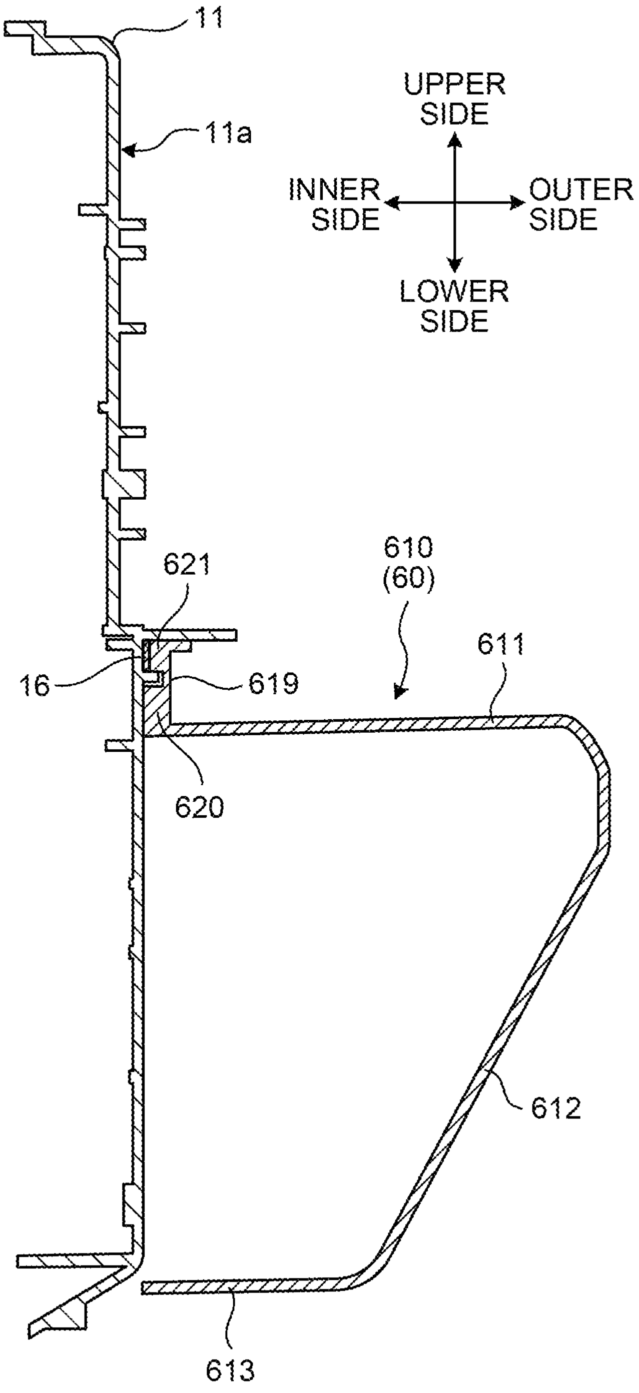

As illustrated in FIG. 10 and FIG. 11, in the cover main body 610, a supporting projection part 620 and a pressing projection part 621 are disposed on a surface positioned on the inner side of the front edge wall part 616, a surface positioned on the inner side of the attachment wall part 617, a surface positioned on the rear side of the upper edge front wall part 618, and a surface positioned on the inner side of the upper edge outer wall part 619. The supporting projection part 620 abuts on the outer surfaces 11*a* and 12*c* of the case 10 in a case in which the cover main body 610 is arranged at the closed position, and is disposed at respective edges close to the inner part of the cover main body 610 of the surface positioned on the inner side of the front edge wall part 616, the surface positioned on the inner side of the attachment wall part 617, the surface positioned on the rear side of the upper edge front wall part 618, and the surface positioned on the inner side of the upper edge outer wall part 619. The pressing projection part 621 is a projecting part that is disposed on an outer surface side of the cover main body 610 than the supporting projection part 620 is, and disposed at a position securing a gap between the pressing projection part 621 and the supporting projection part 620. A projecting dimension of the pressing projection part 621 is set to be smaller than that of the supporting projection part 620. That is, the pressing projection part 621 is configured to secure substantially uniform gaps between the supporting projection part 620 and the outer surfaces 11*a* and 12*c* of the case 10 in a case in which the supporting projection part 620 is caused to abut on the outer surfaces 11*a* and 12*c* of the case 10. A width of the pressing projection part 621 is set to be larger than that of the supporting projection part 620. The supporting projection part 620 and the pressing projection part 621 are formed to have a continuous total length in the cover main body 610.

Additionally, in the cover main body 610, a temporary holding piece 622 is disposed at a portion positioned to be slightly outer than a portion on which the upper edge outer wall part 619 is positioned, above the upper surface of the upper wall part 611. The temporary holding piece 622 has a thin-plate shape projecting toward the upper side, projects toward the upper side from the upper edge outer wall part 619, and may be mounted on a temporary holding groove 12*e* disposed on the outer surface 12*c* of the latch housing part 12 in a detachable manner.

On the other hand, as illustrated in FIG. 4, a seal housing groove 14 and an attachment boss 15 are disposed in the case 10. As illustrated in FIG. 4, FIG. 10, and FIG. 11, the seal housing groove 14 is configured by disposing an inner wall part 14*a* and an outer wall part 14*b* while securing a gap therebetween on the outer surfaces 11*a* and 12*c* of the case 10, and is disposed at a portion that is opposed to the supporting projection part 620 and the pressing projection part 621 in a case in which the cover main body 610 is arranged at the closed position. A mutual interval between the inner wall part 14*a* and the outer wall part 14*b* is formed to have such a dimension that may house the pressing projection part 621 therebetween. As is clear from the drawing, a projecting height of the outer wall part 14*b* is larger than a projecting height of the inner wall part 14*a*. The projecting height of the inner wall part 14*a* is formed to have such a dimension that allows the inner wall part 14*a* to be housed in a gap between the supporting projection part 620 and the pressing projection part 621 disposed in the cover main body 610 in a case in which the supporting projection part 620 is caused to abut on the outer surfaces 11*a* and 12*c* of the case 10.

A continuous sealing member 16 is arranged in the seal housing groove 14. The sealing member 16 is formed in a belt shape by resin having elasticity such as rubber, for example, and a plate thickness dimension thereof is set so that the sealing member 16 is pressed by the pressing projection part 621 in a case in which the supporting projection part 620 is caused to abut on the outer surfaces 11*a* and 12*c* of the case 10.

The attachment boss 15 has a columnar shape including a screw hole 15*a* at a center part, and is disposed at a portion corresponding to the mounting hole 617*a* of the attachment wall part 617 on the outer surface 11*a* of the device main body part 11. An outer diameter of the attachment boss 15 is set to have such a dimension that may engage with the mounting hole 617*a* of the waterproof cover 60.

As illustrated in FIG. 6 and FIG. 7, the cover supporting body 630 of the waterproof cover 60 includes a first supporting plate part (supporting plate element) 631, a second supporting plate part (supporting plate element) 632, and a third supporting plate part (supporting plate element) 633 that are connected to each other in a linear shape to have substantially the same width.

The first supporting plate part 631 is a thin plate member having a rectangular shape that is disposed in a foldable manner at an upper edge part of the attachment wall part 617. A notch for engagement (supporting plate engagement part) 631*a* is disposed on the first supporting plate part 631. The notch for engagement 631*a* is a quadrangular through hole formed at a center portion in a width direction.

The second supporting plate part 632 is a thin plate member having a rectangular shape that is disposed in a foldable manner at an extending edge part of the first supporting plate part 631. An engaging pawl piece (supporting plate engagement part) 632*a* is disposed on the second supporting plate part 632. The engaging pawl piece 632*a* includes an engaging pawl **632*b* at a distal end part, and is disposed at a position corresponding to the notch for engagement 631*a* of the first supporting plate part 631. The notch for engagement 631*a* and the engaging pawl piece 632*a* function such that, in a case in which the first supporting plate part 631 and the second supporting plate part 632 are folded to be overlapped with each other, the engaging pawl piece 632*a* passes through the notch for engagement 631*a* to engage with the first supporting plate part 631, and keeps the first supporting plate part 631 and the second supporting plate part 632 in the overlapped state. An engaged state of the engaging pawl piece 632*a* with respect to the first supporting plate part 631 may be released by bending the engaging pawl piece 632*a***.

The third supporting plate part 633 is a thin plate member that is disposed in a foldable manner at an extending edge part of the second supporting plate part 632, and has an extending edge part formed in a circular arc shape. An attachment hole **633*a* and a plurality of attachment pieces 633*b* are disposed on the third supporting plate part 633. The attachment hole 633*a* is formed to have a circular shape having such a size that may engage with the attachment boss 15 of the case 10, and disposed to pass through the third supporting plate part 633. The attachment pieces 633*b* have a thick plate shape projecting from a portion around the attachment hole 633*a* on a surface of the third supporting plate part 633, and are disposed at positions at regular intervals. As illustrated in FIG. 7, the attachment pieces 633*b* are disposed on a surface on the inner side of the cover main body 610 in a case in which the third supporting plate part 633, the first supporting plate part 631, and the second supporting plate part 632 are arranged in a linear shape. A projecting height of the attachment piece 633*b* is set to be substantially the same as that of a projecting end surface of the attachment boss in a case in which the attachment boss 15 is caused to pass through the attachment hole 633*a*, and the third supporting plate part 633 is caused to abut on the outer surface 11*a* of the device main body part 11**.

As illustrated in FIG. 4 and FIG. 5, the waterproof cover 60 configured as described above is caused to be in a state of being supported by the case 10 via the cover supporting body 630 by screwing a screw member (engagement member) 71 including a washer (engagement member) 70 into the screw hole **15*a* of the attachment boss 15 via the attachment hole 633*a* of the third supporting plate part 633. In view of workability, the waterproof cover 60 is preferably arranged such that the first supporting plate part 631 and the second supporting plate part 632 of the cover supporting body 630 extend toward the upper side with respect to the attachment boss 15. The applied washer 70 has an outer dimension larger than the mutual interval between the cover engagement pieces 617*b* disposed on the attachment wall part 617, and may pass through the mutual interval between the cover engagement pieces 617*b*** in a case of elastically widening the mutual interval.

Figure 12:
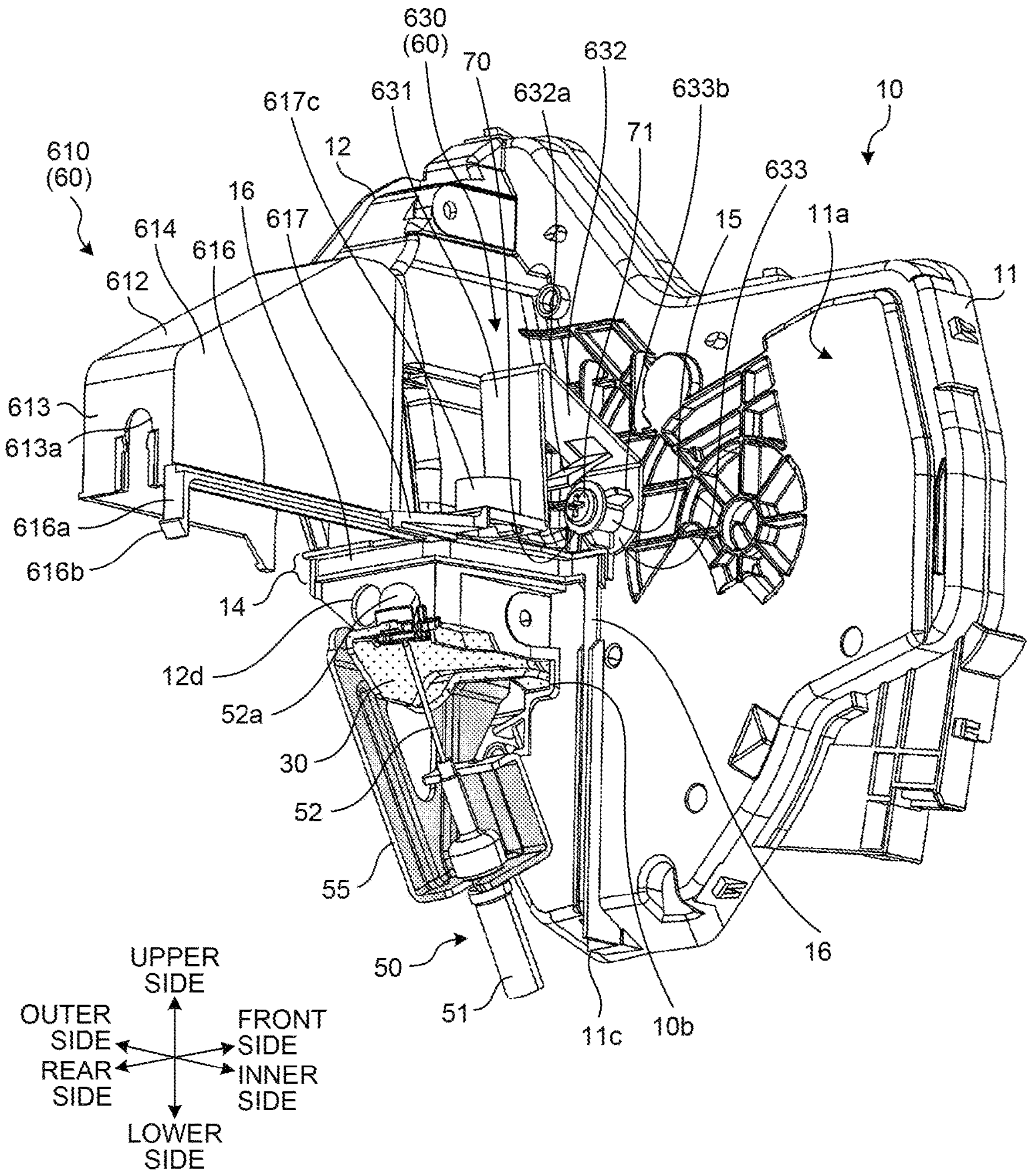
FIG. 12 is a perspective view of the cover member arranged at an opened position in the door latch device illustrated in FIG. 1.
Figure 13:
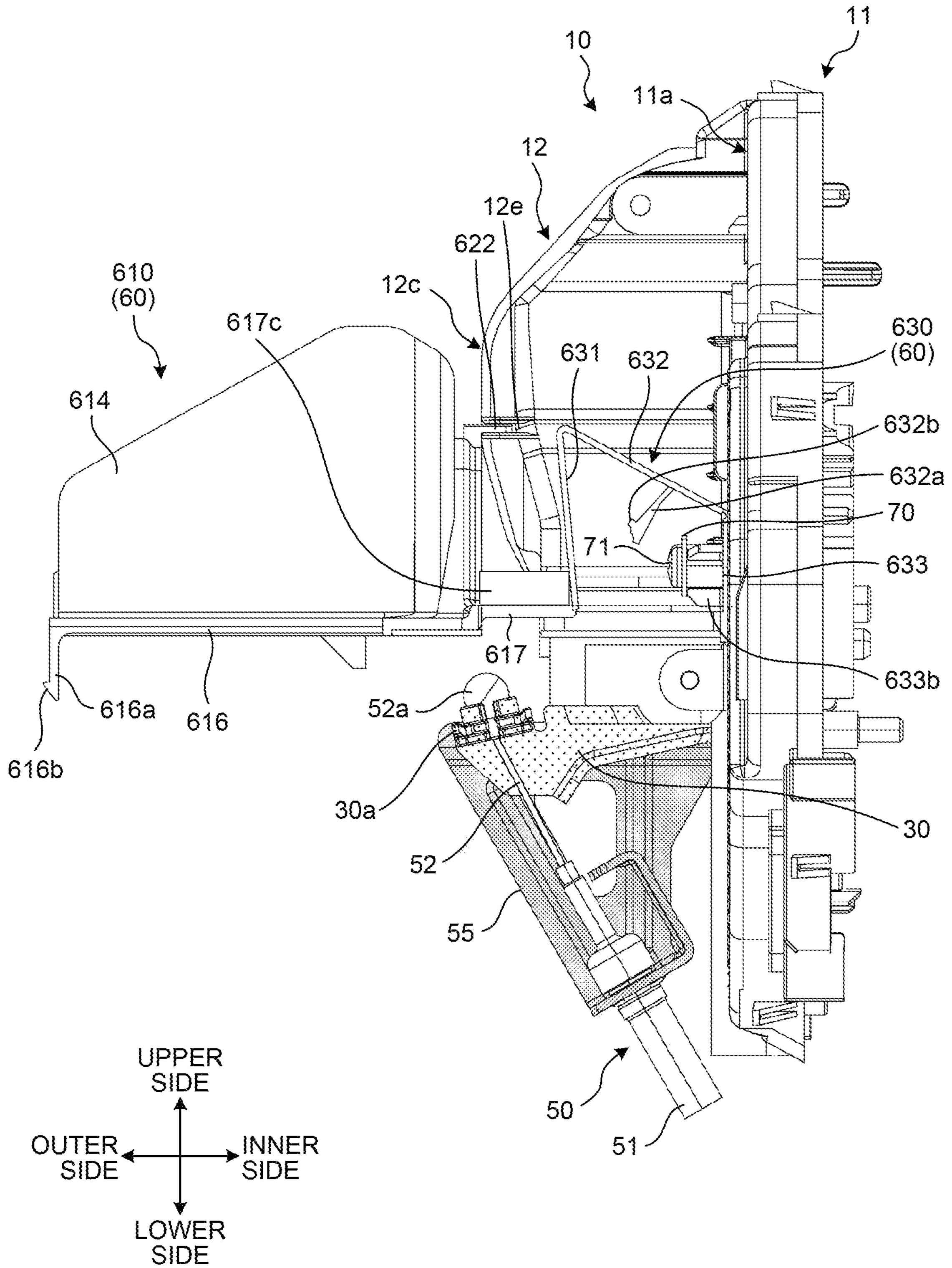
FIG. 13 is a diagram of the door latch device in FIG. 12 viewed from the front side.
Figure 14B:
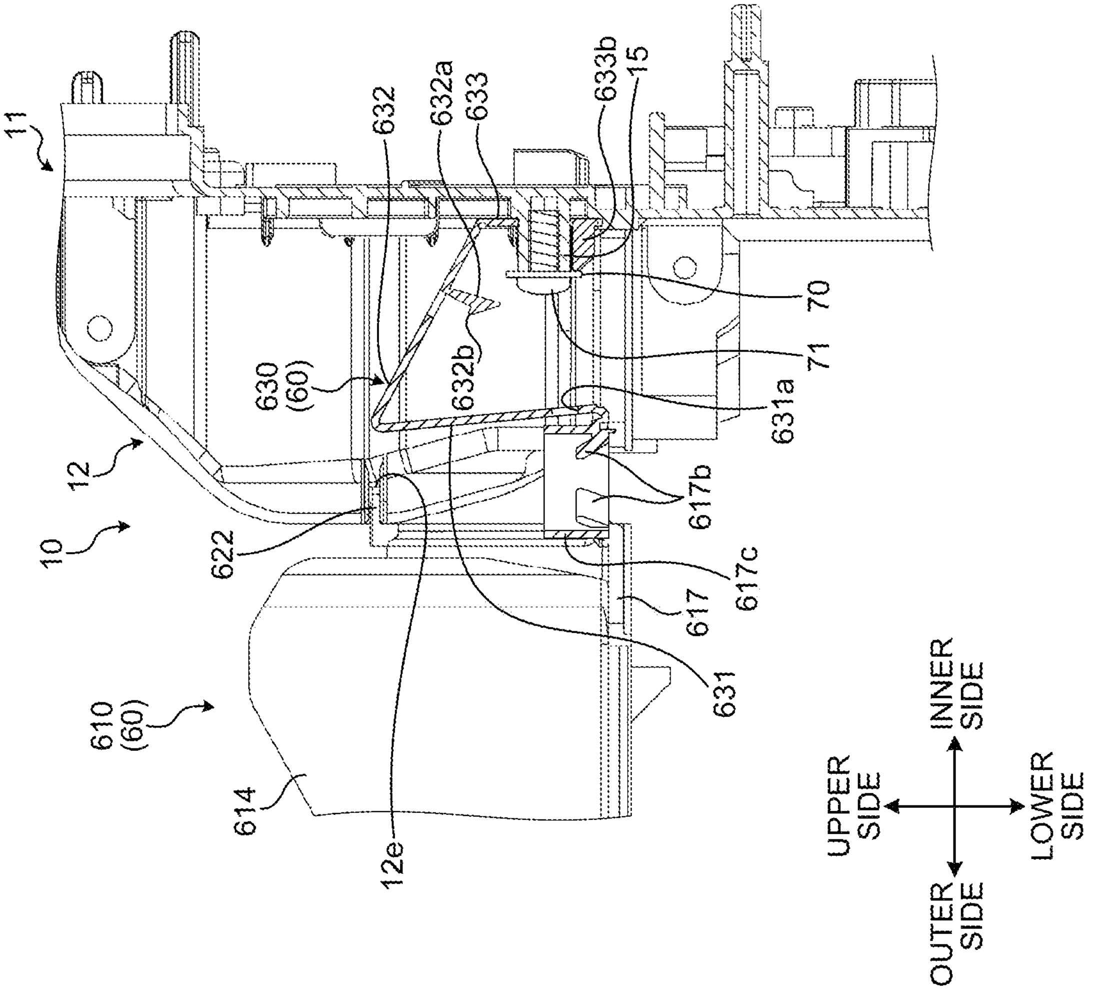
FIGS. 14A and 14B illustrate a principal part of the door latch device illustrated in FIG. 1.
Figure 14A:
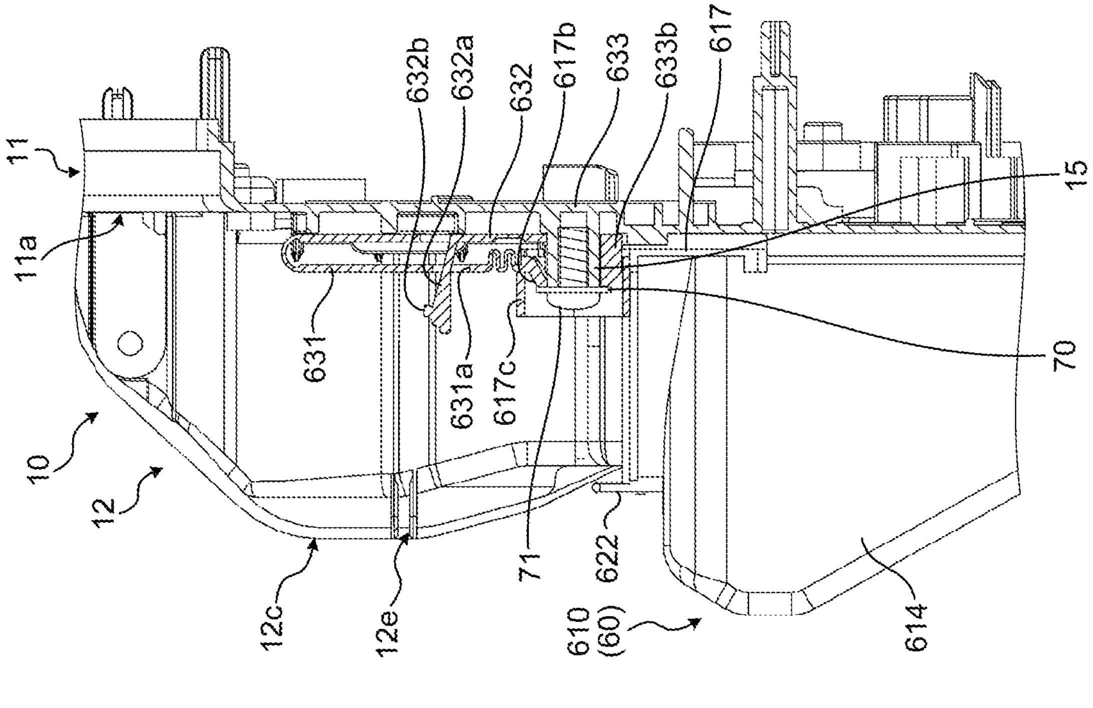

From this state, as illustrated in FIG. 12 to FIG. 14, the second supporting plate part 632 is folded toward the outer side with respect to the third supporting plate part 633, the first supporting plate part 631 is folded toward the lower side with respect to the second supporting plate part 632, and the cover main body 610 is folded toward the outer side with respect to the first supporting plate part 631. Thereupon, the cover main body 610 may be arranged on the outer side of the latch housing part 12 in an attitude such that a portion of the cover opening **610*a* opposed to the outer side wall part 612 faces the lower side (hereinafter, referred to as an opened position of the cover main body 610). Furthermore, from this state, the temporary holding piece 622 is inserted into the temporary holding groove 12*e* of the latch housing part 12. Thereupon, the cover main body 610 arranged at the opened position may be kept in a state of being temporarily held by the case 10. This temporarily held state may prevent a situation in which the cover main body 610 accidentally moves relatively to the case 10, and is advantageous in view of handleability. Due to this, in a case of attaching the door latch device to an inner part of the side door, for example, attachment work may be facilitated by temporarily holding the cover main body 610 onto the case Additionally, in a case in which the cover main body 610 is arranged at the opened position, the outer end part 30*a* of the outside handle lever 30 and the cable bracket 55 are kept in a state of being exposed to the outside, so that work for mounting the outside cable 50 to the outer end part 30*a* of the outside handle lever 30 or the cable bracket 55** may be easily and securely performed.

Figure 15:
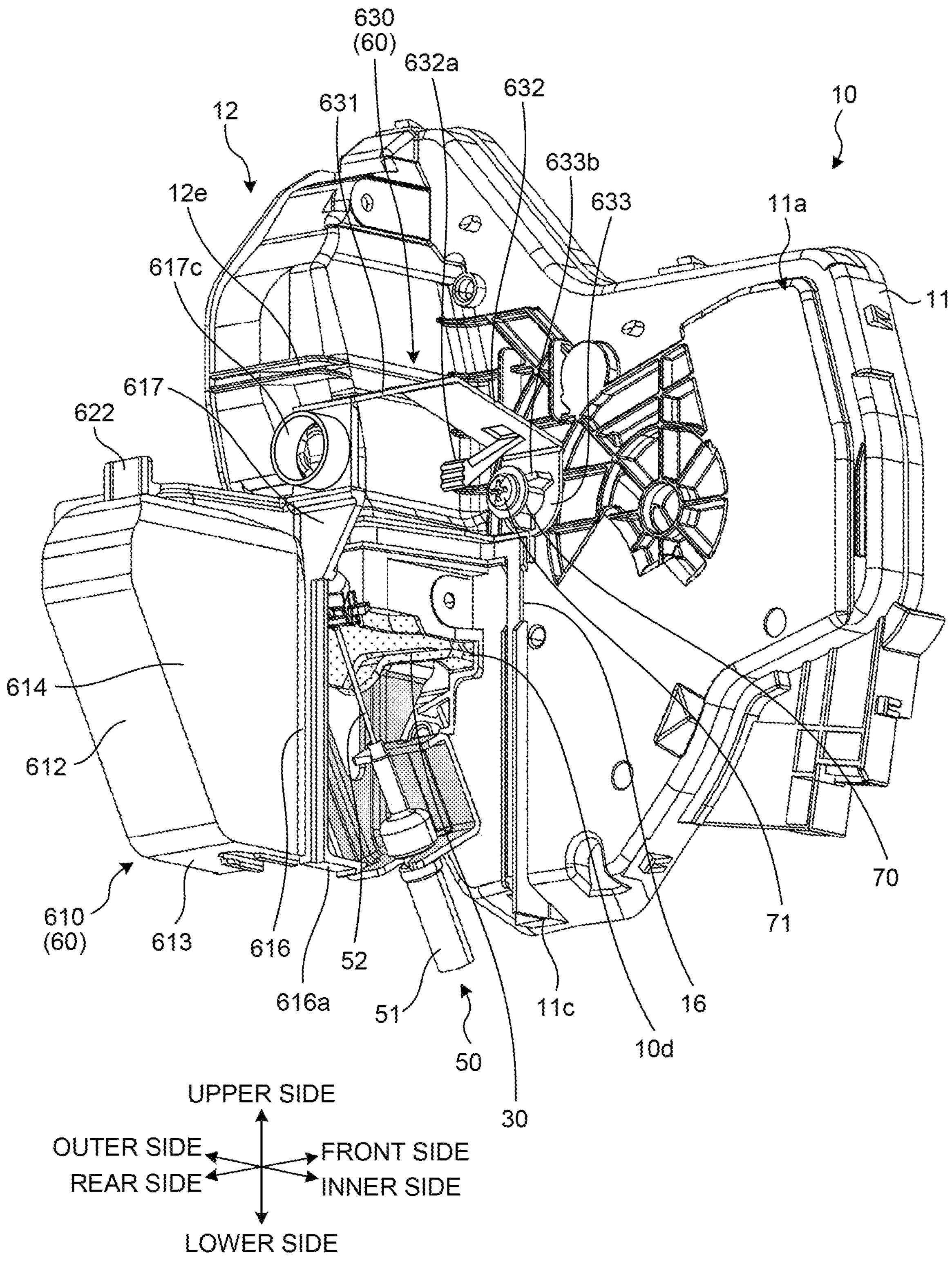
FIG. 15 is a perspective view of a state in which the cover member is arranged at a middle position between the opened position and the closed position in the door latch device illustrated in FIG. 1.
Figure 16:
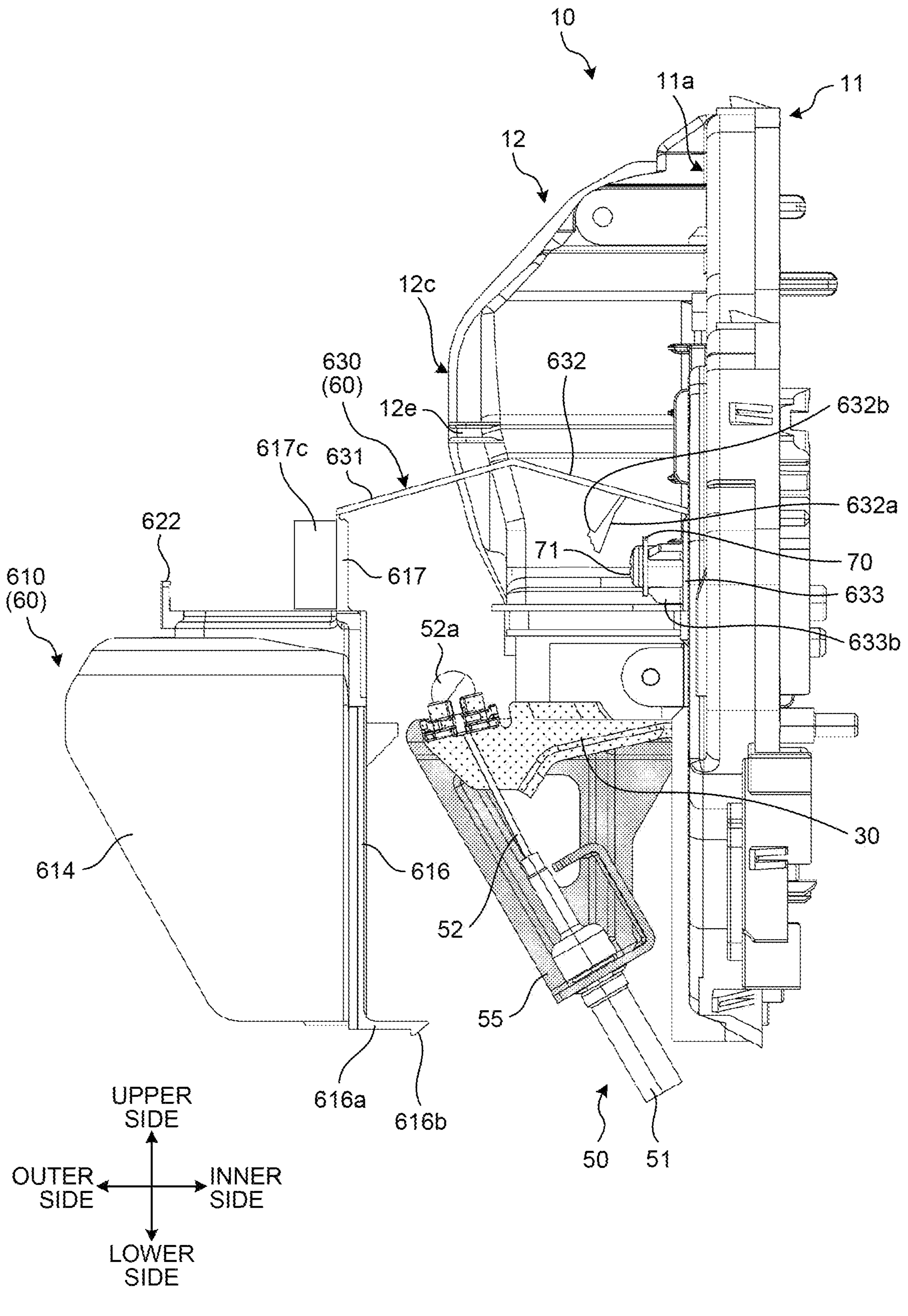
FIG. 16 is a diagram of the door latch device in FIG. viewed from the front side.

After work for mounting the outside cable 50 is finished, the cover main body 610 is movable with respect to the case 10 by pulling out the temporary holding piece 622 from the case 10 and changing the folded state of the cover supporting body 630 as appropriate. Thus, as illustrated in FIG. 15 and FIG. 16, for example, the cover main body 610 may be arranged in the same attitude as the closed position at a position separated from the outer surfaces **11*a* and 12*c* of the case 10, and from this state, the cover main body 610 is caused to abut on the outer surfaces 11*a* and 12*c* of the case 10. Thereupon, the cover main body 610 may house the outer end part 30*a* of the outside handle lever 30, one end part of the outside cable and the cable bracket 55 inside the cover main body 610, as illustrated in FIG. 8 and FIG. 9**.

At this point, the cover main body 610 and the case 10 are positioned by engaging the positioning pin **619*a* of the cover main body 610 with the positioning hole 12*d* of the case 10, and the pressing projection part 621 of the cover main body 610 may be caused to securely abut on the sealing member 16 disposed on the case 10. Thus, when the locking piece 616*a* of the cover main body 610 is locked onto the locking reception part 11*c*, and the washer 70 is caused to pass through the gap between the cover engagement pieces 617*b* of the attachment wall part 617, the cover main body 610 is kept in a state of being arranged at the closed position with respect to the case 10. The outside cable 50 is caused to be in a state of being led out to the outside of the cover main body 610 via the slit 613*a* for a cable disposed on the bottom wall part 613**.

In the state in which the cover main body 610 of the waterproof cover 60 is arranged at the closed position as described above, the pressing projection part 621 is pressed against the sealing member 16. Additionally, regarding an upper edge portion and a front portion of the cover main body 610, a route from the outside to the inner part of the cover main body 610 is made into a labyrinth shape due to the inner wall part **14*a* and the outer wall part 14*b* disposed on the case 10, the supporting projection part 620, and the pressing projection part 621. Accordingly, the front edge wall part 616, the attachment wall part 617, the upper edge front wall part 618, and the upper edge outer wall part 619 of the cover main body 610 abut on the outer surfaces 11*a* and 12*c* of the case 10 in a state of securing watertightness. Thus, even if water enters the inner part of the side door, a situation in which water reaches the inner part of the case 10 may be prevented. Specifically, the cover main body 610 having a box shape is applied to the present embodiment, so that the sealing member 16 only needs to be disposed between the cover main body 610 and the case 10. This configuration prevents the number of components from increasing, and a situation in which work for assembling the door latch device is complicated may be prevented. Additionally, in the state in which the cover main body 610 is arranged at the closed position, the cover supporting body 630 is kept in a state of being tightly folded due to the engaging pawl piece 632***a* engaging with the first supporting plate part 631, so that the projecting amount of the cover supporting body 630 from the case 10 may be reduced. Due to this, a space occupied by the door latch device does not increase inside the side door, and there is no concern for the problem that the cover supporting body 630 interferes with window glass disposed on the side door, for example. In a state before the washer 70 is caused to pass through the gap between the cover engagement pieces 617*b* of the attachment wall part 617, also when the first supporting plate part 631 and the second supporting plate part 632 are folded to be overlapped with each other and the engaging pawl piece 632*a* is engaged with the first supporting plate part 631 via the notch for engagement 631*a*, the cover main body 610 may be temporarily held by the case 10 in a form close to the closed position. Thus, in a case of applying this use method, the temporary holding piece 622 is not necessarily disposed on the cover main body 610, and the temporary holding groove 12*e* is not necessarily disposed on the latch housing part 12.

In the embodiment described above, the screw member 71 and the washer 70 are applied as common engagement members for attaching the cover supporting body 630 and the cover main body 610 to the case 10, and the cover main body 610 is kept at the closed position with respect to the case 10 by engaging the cover engagement pieces 617*b* with the washer 70. However, an engagement member separated from the waterproof cover 60 is not necessarily applied.

Figure 17B:
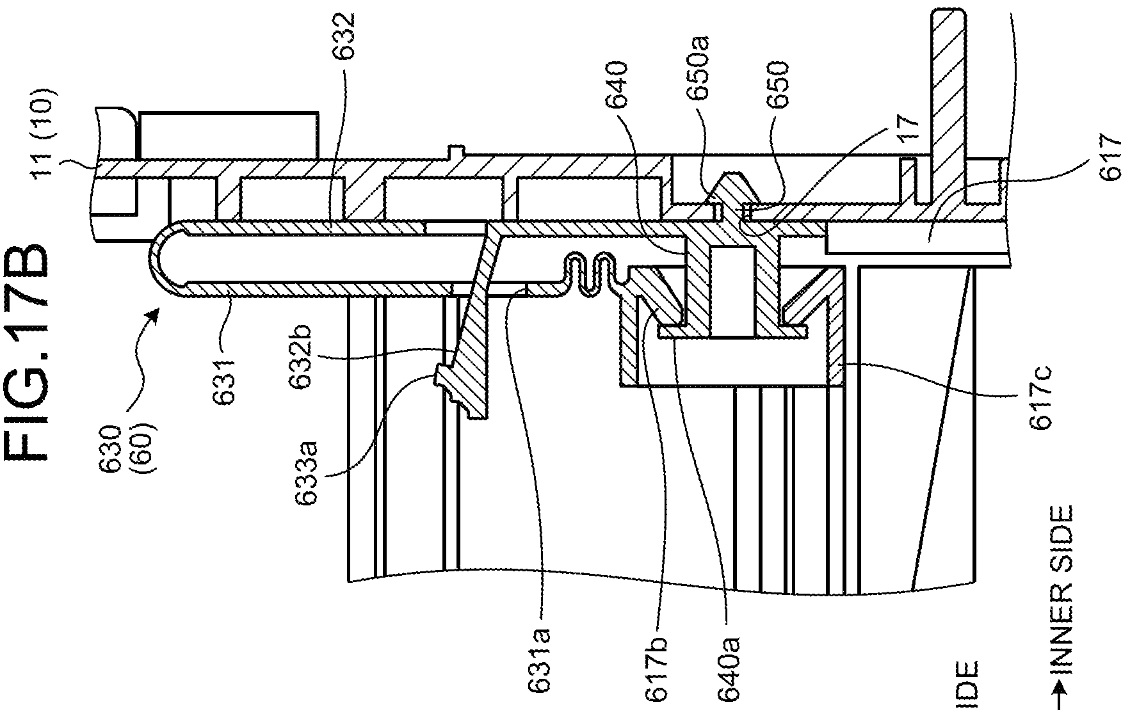
FIGS. 17A and 17B illustrate modifications.
Figure 17B:
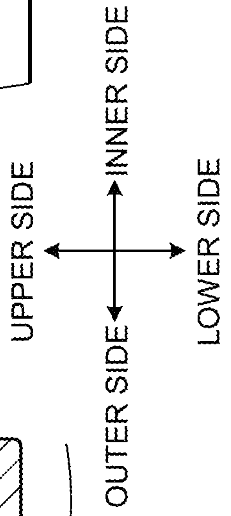
Figure 17A:
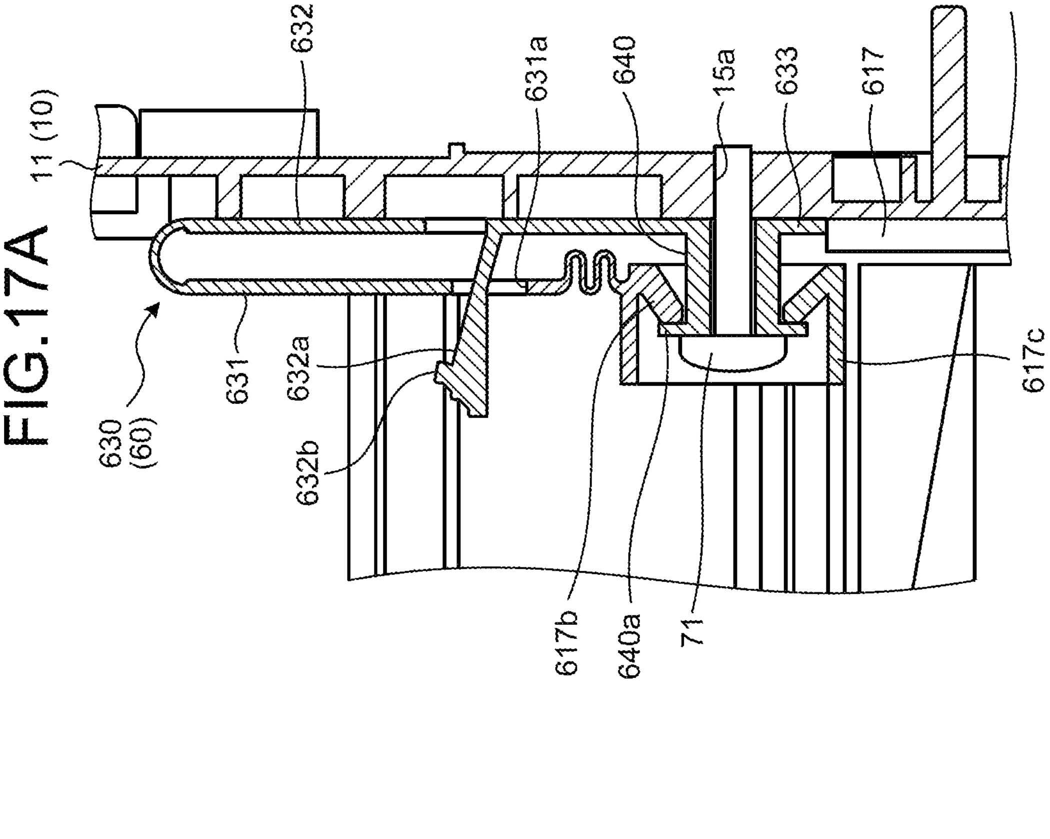

For example, as illustrated in FIG. 17A as a first modification, a cylindrical boss part 640 including a flange (mutual engagement part) 640*a* may be formed integrally with the third supporting plate part 633 of the cover supporting body 630 to apply the flange 640*a* of the boss part 640 as an engagement member. That is, when the boss part 640 has the flange 640*a* having a larger diameter than an outer diameter formed at a projecting end part thereof and the cover engagement pieces (mutual engagement parts) 617*b* of the cover main body 610 are engaged with the flange 640*a*, the cover main body 610 may be kept at the closed position. In the first modification, the attachment boss 15 of the case 10 that is disposed in the embodiment is omitted, and only the screw hole 15*a* is formed. By screwing the screw member 71 into the screw hole 15*a* via the boss part 640, a cover main body (not illustrated) is attached to the case 10 via the cover supporting body 630.

As illustrated in FIG. 17B as a second modification, the cover member may be attached to the case without using the screw member. That is, in the second modification, the boss part 640 including the flange (mutual engagement part) 640*a* is formed integrally with a surface positioned on the outer side of the third supporting plate part 633, an attachment pin 650 is formed integrally with a surface positioned on the inner side, and a hooking part 650*a* disposed at a distal end part of the attachment pin 650 is mounted to the locking hole 17 of the case 10, so as to attach the waterproof cover 60 to the case 10. Also in the second modification, when the cover engagement pieces (mutual engagement parts) 617*b* of the cover main body 610 are engaged with the flange 640*a*, the cover main body 610 may be kept at the closed position. Additionally, the number of components may be reduced by omitting the screw member, and work for assembling the door latch device may be further facilitated. In the first modification and the second modification, the same configuration as that in the embodiment is denoted by the same reference numeral.

In the embodiment described above, the cover main body 610 is exemplified that includes the upper wall part 611, the outer side wall part 612, the bottom wall part 613, the front wall part 614, the rear wall part 615, the front edge wall part 616, the attachment wall part 617, the upper edge front wall part 618, and the upper edge outer wall part 619, but the specific configuration of the cover main body 610 is not limited thereto. The cover main body 610 may have a different shape that is at least a box shape having a cover opening. The sealing member 16 is disposed in the case 10, but the sealing member may be disposed on the cover member. The cover supporting body 630 is exemplified that includes the three supporting plate elements 631, 632, and 633, but the number of the supporting plate elements may be two or more, not limited to three. Additionally, the cover member is disposed with the outside handle lever serving as an input lever, but another input lever may be applied so long as one end part of the input lever projects toward the outside from the case and a cable is connected to the projecting end part for operating the latch mechanism.

According to the present disclosure, the cover main body having a box shape that houses one end part of the input lever and the cable is applied, and the cover main body is attached to the case via the cover supporting body, so that the sealing member may be disposed only between the cover main body and the case. This configuration prevents the number of components from increasing, and may securely prevent a situation in which water enters the inner part of the case without causing a situation in which work for assembling the door latch device is complicated.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A waterproof structure for a door latch device in which one end part of a cable is connected to an input lever, the input lever including one end part projecting toward outside of a case, and an operation force is transmitted to the input lever via the cable to operate a latch mechanism disposed inside the case, the waterproof structure comprising:

a cover including:

- a cover main body having a box shape with a cover opening, the cover main body being configured to house the one end part of the input lever and the one end part of the cable via the cover opening when the cover main body abuts on the case; and
- a cover supporting body extending from the cover main body;

a plurality of mutual engagement parts disposed around a circular mounting hole at regular intervals;

a positioning pin and a locking piece provided in one of the cover main body and the case; and a positioning hole and a locking reception part provided in another one of the cover main body and the case, wherein the cover is attached to the case via the cover supporting body in a state in which the cover main body is movable between a closed position at which the cover main body abuts on the case and an opened position at which the cover main body is separated from the case, the plurality of mutual engagement parts are disposed between the cover supporting body and the cover main body, the plurality of mutual engagement parts being configured to restrict movement of the cover main body to the opened position by engaging with each other when the cover main body is arranged at the closed position, the positioning pin and the positioning hole are engaged with each other and the locking piece and the locking reception part are locked with each other at the closed position, the input lever is provided in a rotatable manner between a latch housing part of the case and a cable bracket, the cover main body further houses the cable bracket, and the cover main body is formed of a single member.

2. The waterproof structure according to claim 1, further comprising:

an engagement member configured to attach the cover supporting body to the case; and a cover engagement part disposed on the cover main body, the cover engagement part being configured to restrict movement of the cover main body to the opened position by engaging with the engagement member when the cover main body is arranged at the closed position.

3. The waterproof structure according to claim 1, wherein the cover supporting body includes a plurality of supporting plate elements coupled to each other in a foldable manner, and the cover main body is moved between the closed position and the opened position by changing folded states of the supporting plate elements.

4. The waterproof structure according to claim 3, wherein, the cover supporting body includes two supporting plate elements configured to be overlapped with each other when the cover main body is arranged at the closed position, and the waterproof structure further comprising a supporting plate engagement part disposed between one of the supporting plate elements and another one of the supporting plate elements, the supporting plate engagement part being configured to restrict movement in a direction for releasing the overlapped state by making engagement in a detachable manner when the supporting plate elements are overlapped with each other.

5. The waterproof structure according to claim 1, further comprising a temporary holding piece disposed on the cover main body, the temporary holding piece being configured to be engaged with the case in a detachable manner when the cover main body is arranged at the opened position.

6. The waterproof structure according to claim 1, further comprising:

a continuous sealing member disposed at an abutting portion of the case and the cover main body; and a continuous pressing projection part disposed on at least one of the case and the cover main body, the pressing projection part being configured to press the sealing member over a total length when the cover main body is arranged at the closed position.

7. The waterproof structure according to claim 1, wherein the plurality of mutual engagement parts are configured to project from an inner peripheral surface of the mounting hole.

8. The waterproof structure according to claim 7, wherein the plurality of mutual engagement parts are elastically deformed, and gaps formed among projecting end parts of the plurality of mutual engagement parts are widened.

9. The waterproof structure according to claim 7, wherein the plurality of mutual engagement parts and the mounting hole are disposed on an attachment wall part.

10. The waterproof structure according to claim 3, wherein the plurality of supporting plate elements are directly connected with each other.

11. The waterproof structure according to claim 9, wherein the cover supporting body includes a plurality of supporting plate elements coupled to each other in a foldable manner, the cover main body is moved between the closed position and the opened position by changing folded states of the supporting plate elements, and the plurality of supporting plate elements as a whole are disposed on one side of the attachment wall part.

* * * * *